US012604148B2

(12) United States Patent
Austin et al.

(10) Patent No.: US 12,604,148 B2
(45) Date of Patent: Apr. 14, 2026

(54) AUDIO PROCESSING USING EAR-WEARABLE DEVICE AND WEARABLE VISION DEVICE

(71) Applicant: Starkey Laboratories, Inc., Eden Prairie, MN (US)

(72) Inventors: William F. Austin, Eden Prairie, MN (US); Achintya Kumar Bhowmik, Cupertino, CA (US); David Alan Fabry, Eden Prairie, MN (US); Amit Shahar, Hod HaSharon (IL); Majd Srour, Nesher (IL)

(73) Assignee: Starkey Laboratories, Inc., Eden Prairie, MN (US)

( * ) Notice: Subject to any disclaimer, the term of this patent is extended or adjusted under 35 U.S.C. 154(b) by 284 days.

(21) Appl. No.: 18/108,137

(22) Filed: Feb. 10, 2023

(65) Prior Publication Data

US 2023/0292064 A1 Sep. 14, 2023

Related U.S. Application Data

(60) Provisional application No. 63/309,408, filed on Feb. 11, 2022.

(51) Int. Cl.
| | |
|---|---|
| *H04R 25/00* | (2006.01) |
| *G06F 3/14* | (2006.01) |
| *H04R 1/08* | (2006.01) |

(52) U.S. Cl.
CPC ............. *H04R 25/554* (2013.01); *G06F 3/14* (2013.01); *H04R 1/08* (2013.01)

(58) Field of Classification Search
CPC ...... H04R 1/08; H04R 1/1016; H04R 1/1041; H04R 1/406; H04R 25/407; H04R 25/43;
(Continued)

(56) References Cited

U.S. PATENT DOCUMENTS

| | | | |
|---|---|---|---|
| 5,526,407 | A | 6/1996 | Russell et al. |
| 6,236,969 | B1 | 5/2001 | Ruppert et al. |

(Continued)

FOREIGN PATENT DOCUMENTS

| | | |
|---|---|---|
| DE | 10145994 | 4/2003 |
| EP | 2806618 | 11/2014 |

(Continued)

OTHER PUBLICATIONS

"International Preliminary Report on Patentability," for PCT Application No. PCT/US2020/012173 mailed Jul. 15, 2021 (8 pages).

(Continued)

*Primary Examiner* — Gerald Gauthier
(74) *Attorney, Agent, or Firm* — Pauly, DeVries Smith & Deffner LLC

(57) ABSTRACT

A hearing assisting system is included having a first microphone and a second microphone. The system further includes a vision device having a display device, where the display device is configured to display visual information to the user when the user is wearing the vision device. The system is further configured to process audio signals to identify first audio content information and first audio direction information related to the first audio content information. The system further can transmit, to the vision device, first display information to cause the vision device to display a non-transcript content representation of the first audio content information and a direction representation of the first audio direction information using the display device.

20 Claims, 17 Drawing Sheets

(58) Field of Classification Search

CPC ...... H04R 25/554; H04R 3/005; H04R 1/028; H04R 25/552; G06F 3/14; G06F 9/44505; G02B 2027/0141; G09G 2354/00; G09G 2380/08; G02C 11/06; G02C 11/10; G06Q 30/0281; G10L 13/02; G10L 15/25; G10L 17/04; G10L 17/22

See application file for complete search history.

(56) References Cited

U.S. PATENT DOCUMENTS

| | | | |
|---|---|---|---|
| 6,560,468 B1 | 5/2003 | Boesen | |
| 6,778,674 B1* | 8/2004 | Panasik | H04R 25/552 |
| | | | 381/313 |
| 6,779,030 B1 | 8/2004 | Dugan et al. | |
| 6,879,698 B2 | 4/2005 | Boesen | |
| 7,512,414 B2 | 3/2009 | Jannard et al. | |
| 8,494,193 B2 | 7/2013 | Zhang et al. | |
| 8,825,468 B2 | 9/2014 | Jacobsen et al. | |
| 8,958,586 B2 | 2/2015 | Preves | |
| 9,002,045 B2 | 4/2015 | Merks | |
| 9,042,586 B2 | 5/2015 | Burns et al. | |
| 9,129,291 B2* | 9/2015 | Goldstein | G06Q 30/0281 |
| 9,167,356 B2 | 10/2015 | Higgins et al. | |
| 9,197,970 B2 | 11/2015 | Zhang et al. | |
| 9,264,824 B2 | 2/2016 | Pruthi et al. | |
| 9,288,588 B2* | 3/2016 | Mesfin | H04R 25/552 |
| 9,294,849 B2 | 3/2016 | Burns et al. | |
| 9,641,942 B2 | 5/2017 | Strelcyk et al. | |
| 9,699,573 B2 | 7/2017 | Merks | |
| 9,740,686 B2 | 8/2017 | Johansson | |
| 9,848,273 B1 | 12/2017 | Helwani et al. | |
| 9,940,928 B2 | 4/2018 | Haubrich et al. | |
| 9,949,041 B2 | 4/2018 | Liao et al. | |
| 9,980,033 B2 | 5/2018 | Boesen | |
| 9,992,316 B2 | 6/2018 | Hardi | |
| 10,051,364 B2 | 8/2018 | Kim et al. | |
| 10,129,664 B2 | 11/2018 | Fitz et al. | |
| 10,219,063 B1 | 2/2019 | Valenzuela et al. | |
| 10,224,057 B1 | 3/2019 | Chevrier | |
| 10,249,305 B2 | 4/2019 | Yu | |
| 10,332,513 B1 | 6/2019 | D'Souza et al. | |
| 10,643,611 B2 | 5/2020 | Lindahl | |
| 10,657,042 B2 | 5/2020 | Moon et al. | |
| 10,674,285 B2 | 6/2020 | Walsh et al. | |
| 10,777,202 B2 | 9/2020 | Mindlin et al. | |
| 10,863,032 B2 | 12/2020 | Norris et al. | |
| 10,957,337 B2 | 3/2021 | Chen et al. | |
| 10,959,027 B2 | 3/2021 | Wexler et al. | |
| 11,264,029 B2 | 3/2022 | Bhowmik et al. | |
| 11,264,035 B2 | 3/2022 | Bhowmik et al. | |
| 11,275,482 B2 | 3/2022 | Osterhout et al. | |
| 2006/0034481 A1 | 2/2006 | Barzegar et al. | |
| 2006/0167687 A1 | 7/2006 | Kates | |
| 2008/0031475 A1 | 2/2008 | Goldstein | |
| 2008/0195394 A1 | 8/2008 | Francioli | |
| 2008/0253583 A1 | 10/2008 | Goldstein et al. | |
| 2009/0204410 A1 | 8/2009 | Mozer et al. | |
| 2010/0036667 A1 | 2/2010 | Byford et al. | |
| 2010/0222098 A1 | 9/2010 | Garg | |
| 2012/0078628 A1 | 3/2012 | Ghulman | |
| 2013/0054237 A1 | 2/2013 | Furman et al. | |
| 2013/0144622 A1 | 6/2013 | Yamada et al. | |
| 2014/0122073 A1 | 5/2014 | Goldstein | |
| 2014/0163982 A1 | 6/2014 | Daborn et al. | |
| 2014/0236594 A1 | 8/2014 | Clarke et al. | |
| 2014/0348364 A1* | 11/2014 | Edwards | G02C 11/10 |
| | | | 381/327 |
| 2015/0036856 A1 | 2/2015 | Pruthi et al. | |
| 2015/0168996 A1 | 6/2015 | Sharpe et al. | |
| 2015/0230022 A1 | 8/2015 | Sakai et al. | |
| 2015/0319546 A1 | 11/2015 | Sprague | |
| 2016/0183014 A1* | 6/2016 | Guo | G10L 15/25 |
| | | | 381/313 |
| 2017/0048627 A1* | 2/2017 | Fitz | H04R 25/554 |

| | | | |
|---|---|---|---|
| 2017/0127196 A1* | 5/2017 | Blum | H04R 25/554 |
| 2017/0155756 A1 | 6/2017 | Kim et al. | |
| 2017/0243582 A1 | 8/2017 | Menezes et al. | |
| 2017/0332187 A1* | 11/2017 | Lin | G10L 17/22 |
| 2017/0358317 A1 | 12/2017 | James | |
| 2018/0063624 A1 | 3/2018 | Boesen | |
| 2018/0103859 A1 | 4/2018 | Provenzano | |
| 2018/0113673 A1 | 4/2018 | Sheynblat | |
| 2018/0122025 A1 | 5/2018 | Boesen | |
| 2018/0158365 A1 | 6/2018 | Roche | |
| 2018/0201226 A1 | 7/2018 | Falkson et al. | |
| 2018/0211658 A1 | 7/2018 | Segal et al. | |
| 2018/0317837 A1 | 11/2018 | Burwinkel et al. | |
| 2018/0341582 A1 | 11/2018 | Moon et al. | |
| 2018/0343527 A1 | 11/2018 | Edwards | |
| 2019/0007540 A1 | 1/2019 | Shaik et al. | |
| 2019/0011978 A1* | 1/2019 | Ravindran | G06F 3/012 |
| 2019/0362149 A1 | 11/2019 | Mukhopadhyay | |
| 2019/0371315 A1 | 12/2019 | Newendorp et al. | |
| 2020/0077892 A1 | 3/2020 | Tran | |
| 2020/0104194 A1 | 4/2020 | Chalmers et al. | |
| 2020/0152185 A1 | 5/2020 | Usher et al. | |
| 2020/0152227 A1 | 5/2020 | Xiang et al. | |
| 2020/0219506 A1 | 7/2020 | Bhowmik et al. | |
| 2020/0219515 A1* | 7/2020 | Bhowmik | H04R 1/1016 |
| 2020/0245938 A1* | 8/2020 | Xu | A61B 5/0205 |
| 2020/0268315 A1 | 8/2020 | Burwinkel et al. | |
| 2020/0275216 A1 | 8/2020 | McKinney et al. | |
| 2021/0044888 A1 | 2/2021 | Sabin et al. | |
| 2021/0055367 A1* | 2/2021 | Poore | G01S 3/8083 |
| 2021/0160625 A1 | 5/2021 | Wexler et al. | |
| 2021/0168517 A1 | 6/2021 | Wexler et al. | |
| 2021/0173480 A1* | 6/2021 | Osterhout | G06F 3/04815 |
| 2021/0258703 A1 | 8/2021 | Wexler et al. | |
| 2021/0312940 A1 | 10/2021 | Lipman | |
| 2022/0261587 A1* | 8/2022 | Wexler | G10L 17/04 |
| 2022/0377467 A1 | 11/2022 | Wexler et al. | |
| 2023/0094048 A1* | 3/2023 | Neves Creto | G08B 5/22 |
| | | | 345/156 |
| 2023/0168951 A1* | 6/2023 | Moore | G06F 9/44505 |
| | | | 719/318 |
| 2023/0188907 A1* | 6/2023 | Bhowmik | H04R 25/554 |
| | | | 381/315 |
| 2023/0197080 A1* | 6/2023 | Goldstein | G06Q 30/0621 |
| | | | 381/74 |
| 2023/0221583 A1* | 7/2023 | Elkenawy | G02C 11/06 |
| | | | 381/124 |
| 2023/0292064 A1* | 9/2023 | Austin | G06F 3/14 |
| 2024/0070251 A1* | 2/2024 | Maizels | G10L 13/02 |
| 2024/0212719 A1* | 6/2024 | Kim | G11B 27/10 |
| 2025/0173415 A1* | 5/2025 | Maizels | H04R 1/028 |

FOREIGN PATENT DOCUMENTS

| | | |
|---|---|---|
| EP | 2991372 | 3/2016 |
| EP | 3882894 | 1/2022 |
| WO | 2011028800 | 3/2011 |
| WO | 2014190086 | 11/2014 |
| WO | 2016050724 | 4/2016 |
| WO | 2017134300 | 8/2017 |
| WO | 2020097353 | 5/2020 |
| WO | 2020097355 | 5/2020 |
| WO | 2020142679 | 7/2020 |
| WO | 2020142680 | 7/2020 |
| WO | 2021050354 | 3/2021 |
| WO | 2021138647 | 7/2021 |
| WO | 2021138648 | 7/2021 |
| WO | 2021142297 | 7/2021 |
| WO | 2022010465 | 1/2022 |
| WO | 2023283569 | 1/2023 |

OTHER PUBLICATIONS

"International Preliminary Report on Patentability," for PCT Application No. PCT/US2020/012174 mailed Jul. 15, 2021 (9 pages).

"International Search Report and Written Opinion," for PCT Application No. PCT/US2020/012173 mailed Mar. 23, 2020 (13 pages).

(56) References Cited

OTHER PUBLICATIONS

"International Search Report and Written Opinion," for PCT Application No. PCT/US2020/012174 mailed Apr. 6, 2020 (13 pages).

"Machine Learning Basics—An Illustrated Guide for Non-Technical Readers," data iku guidebook, 2017 (15 pages).

"Mojo Vision," Company website URL <https://www.mojo.vision/> downloaded Jan. 20, 2023 (8 pages).

"OrCam MyEye," product available on OrCam website at least as early as Jan. 20, 2023, URL <https://www.orcam.com/en/myeye2/> (10 pages).

"Xrai Glasses Website," URL <https://xrai.glass/> at least as early as Jul. 26, 2022 (17 pages).

Baker, Morgan L. "Deaf Accessibility in Video Games—When/How to use Deaf Accessibility Tools," Published on Gamasutra, Jul. 2020, URL <https://leahybaker.com/deaf_access> (37 pages).

Jain, Dhruv, et al. "Towards Sound Accessibility in Virtual Reality," ICMI '21, Oct. 18-22, 2021, Montreal, QC (18 pages).

Nogueira, Denise, et al. "Analyzing the Use of Sounds in FPS games and its Impact for Hearing Impaired Users," 2012, available at URL <https://citeseerx.ist.psu.edu/document?repid=rep1&type=pdf&doi=3475c292aca5ba8e408a7b936e6a198e541ff996> (7 pages).

\* cited by examiner

316

310

Your name was called
ahead and to the right

312

314

DISMISS     MENU 318     320

110     220

120

AUDIO PROCESSING USING EAR-WEARABLE DEVICE AND WEARABLE VISION DEVICE

This application claims the benefit of U.S. Provisional Application No. 63/309,408, filed Feb. 11, 2022, the content of which is incorporated herein by reference in its entirety.

BACKGROUND

Hearing-impaired people often have challenges with detecting sounds, understanding the source or meaning of the sound, and detecting the direction of sounds in their audio environment, even when they wear hearing aids that provide amplified audio from their environment. Higher-frequency sounds, including sirens, doorbells, or high-pitched voices, can be particularly difficult for many people because high-frequency hearing loss is one of the most common types of hearing loss.

SUMMARY

In a first aspect, a hearing assisting system includes a first ear-wearable device, wherein the first ear-wearable device can be configured to: be worn by a user in contact with an ear of the user, direct sound from a first electroacoustic transducer toward the user's ear when the first ear-wearable device can be worn by the user, and wirelessly transmit a first input audio signal received at a first microphone at a first microphone location. The system further includes a vision device, where the vision device can include or define a lens portion, wherein the vision device can be configured to be worn by the user so that the user looks through the lens portion. The vision device further can include a display device, wherein the display device can be configured to display visual information to the user when the user is wearing the vision device. The system further includes a second microphone, wherein the second microphone can be configured to be positioned at a second microphone location, wherein the hearing assisting system can be configured to store computer instructions for: receiving, from the first microphone, the first input audio signal. The system is further configured to receive, from the second microphone, a second input audio signal, wherein the first audio input signal and the second audio input signal both include first audio information from a first time period. The system is further configured to process the first input audio signal and the second input audio signal to identify first audio content information and first audio direction information related to the first audio content information. The system is further configured to wirelessly transmit, to the vision device, first display information to cause the vision device to display a non-transcript content representation of the first audio content information and a direction representation of the first audio direction information using the display device.

In a second aspect, in addition to one or more of the preceding or following aspects, or in the alternative to some aspects, the first ear-wearable device further includes: a first control circuit, the first transducer, wherein the first transducer can be configured to generate sound and can be in electrical communication with the first control circuit, the first microphone, wherein the first microphone can be in electrical communication with the first control circuit, a first memory storage, and a first wireless communication device, wherein the vision device further includes: a vision device control circuit, a vision device wireless communication device, a vision device camera, and a vision device memory, wherein the vision device wireless communication device can be configured to receive the first display information.

In a third aspect, in addition to one or more of the preceding or following aspects, or in the alternative to some aspects, the vision device further includes the second microphone.

In a fourth aspect, in addition to one or more of the preceding or following aspects, or in the alternative to some aspects, the system further can include a second ear-wearable device, the second ear-wearable device can include: a second control circuit, a second electroacoustic transducer, wherein the second transducer can be configured to generate sound and can be in electrical communication with the second control circuit, the second microphone, wherein the second microphone can be in electrical communication with the second control circuit, a second memory storage, and a second wireless communication device. The second ear-wearable device can be configured to: be worn by a user in contact with a second ear of the user, direct sound from the first transducer toward the user's ear when the second ear-wearable device can be worn by the user, and wirelessly transmit the second input audio signal received at the second microphone.

In a fifth aspect, in addition to one or more of the preceding or following aspects, or in the alternative to some aspects, the system further can include a gateway device, the gateway device can include: a gateway device control circuit, a gateway device wireless communication device, and a gateway device memory, and a gateway device wireless communication device, wherein the gateway device memory stores instructions for: wirelessly receiving, at the gateway device wireless communication device, the first input audio signal and the second input audio signal, processing the first input audio signal and the second input audio signal to identify the first audio content information and the first audio direction information, and wirelessly transmitting, to the vision device, the first display information to cause the vision device to display the content representation of the first audio content information and the direction representation of the first audio direction information using the display device.

In a sixth aspect, in addition to one or more of the preceding or following aspects, or in the alternative to some aspects, the vision device further includes a vision device microphone positioned on the vision device, wherein the system analyzes audio input from the first microphone, the second microphone, and the vision device microphone to process the first input audio signal and the second input audio signal to identify the first audio content information and the first audio direction information.

In a seventh aspect, in addition to one or more of the preceding or following aspects, or in the alternative to some aspects, the gateway device memory stores instructions for: identifying a presence of a first emergency notification sound as the first audio content information within the first audio content information, and upon identifying the presence of the first emergency notification sound, the content representation will identify the first emergency notification sound, wherein the first emergency notification sound can be one of the group consisting of a siren, an emergency vehicle siren, a tornado siren, an emergency weather siren, a public safety siren, a horn, a train whistle, a train horn, a vehicle horn, a smoke alarm, a fire alarm, a carbon-monoxide alarm, and a law enforcement announcement.

In an eighth aspect, in addition to one or more of the preceding or following aspects, or in the alternative to some aspects, the system is configured to, upon displaying the content representation, apply a tinting to the lens portion for an alert time period.

In a ninth aspect, in addition to one or more of the preceding or following aspects, or in the alternative to some aspects, the gateway device memory stores instructions for identifying a name call as the first audio content information within the first audio content information, wherein the instructions include a user name and user name variations.

In a tenth aspect, in addition to one or more of the preceding or following aspects, or in the alternative to some aspects, the first ear-wearable device further includes a telecoil, wherein the hearing assisting system can be configured to: detect a first electromagnetic signal at the telecoil, analyze the first electromagnetic signal to determine telecoil information related to a presence of an appliance that generated the first electromagnetic signal in an environment of the first ear-wearable device, and transmit, to the vision device, telecoil display information to cause the vision device to display a representation of telecoil information using the display device.

In an eleventh aspect, in addition to one or more of the preceding or following aspects, or in the alternative to some aspects, the direction representation includes text describing a direction of a sound within the first audio information.

In a twelfth aspect, in addition to one or more of the preceding or following aspects, or in the alternative to some aspects, the direction representation includes an arrow pointing toward a direction of a sound within the first audio information.

In a thirteenth aspect, in addition to one or more of the preceding or following aspects, or in the alternative to some aspects, the direction representation includes tinting of a lens portion in a direction opposite from a direction of a sound within the first audio information.

In a fourteenth aspect, in addition to one or more of the preceding or following aspects, or in the alternative to some aspects, the vision device includes at least one of: a contact lens configured to be worn on an eyeball of a user, and a glasses device configured to be worn in front of at least one eye of the user.

In a fifteenth aspect, in addition to one or more of the preceding or following aspects, or in the alternative to some aspects, the second microphone location can be spaced apart from the first microphone location by at least 1 centimeter.

In a sixteenth aspect, a method can be included, the method including receiving a first audio signal at a first microphone of an ear-wearable device of a hearing assisting system, receiving a second audio signal at a second microphone of the hearing assisting system, wherein the first audio signal and second audio signal include first audio information from a first time period, processing, by a processing system that includes one or more processors, the first input audio signal and the second input audio signal to identify first audio content information and first audio direction information related to the first audio content information, and wirelessly transmitting, to a wearable vision device, first display information to cause the vision device to display a non-transcript content representation of the first audio content information and a direction representation of the first audio direction information using a display device of the vision device, wherein the vision device further includes or defines a lens portion, wherein the vision device can be configured to be worn by a user so that the user looks through the lens portion, wherein the display device can be configured to display visual information to the user when the user can be wearing the vision device.

In a seventeenth aspect, in addition to one or more of the preceding or following aspects, or in the alternative to some aspects, the method can include identifying, by a processing system that includes one or more processors, a presence of a first emergency notification sound as the first audio content information within the first audio content information. The method can further include, upon identifying the presence of the first emergency notification sound, the content representation will identify the first emergency notification sound, wherein the first emergency notification sound can be one of the group consisting of a siren, an emergency vehicle siren, a tornado siren, an emergency weather siren, a public safety siren, a horn, a train whistle, a train horn, a vehicle horn, a smoke alarm, a fire alarm, a carbon-monoxide alarm, and a law enforcement announcement.

In an eighteenth aspect, in addition to one or more of the preceding or following aspects, or in the alternative to some aspects, the method can further include identifying, by the processing system, a name call as the first audio content information within the first audio content information, wherein a memory system can include one or more memory devices stores instructions can include a user name and user name variations.

In a nineteenth aspect, in addition to one or more of the preceding or following aspects, or in the alternative to some aspects, the first ear-wearable device further includes a telecoil, and the method can further can include detecting a first electromagnetic signal at the telecoil, analyzing, using the processing system, the first electromagnetic signal to determine telecoil information related to a presence of an appliance that generated the first electromagnetic signal in an environment of the ear-wearable device, and transmitting, to the vision device, telecoil display information to cause the vision device to display a representation of telecoil information using the display device.

In a twentieth aspect, a method can be included, the method including obtaining, by a processing system that includes one or more processors implemented in circuitry, a signal from a telecoil of an ear-wearable device, wherein the ear-wearable device can be configured to be worn by a user in contact with an ear of the user and direct sound from a first electroacoustic transducer toward the user's ear when the first ear-wearable device can be worn by the user. The method can further include determining, by the processing system, telecoil information related to a presence of an electromagnetic signal in an environment of the ear-wearable device, based at least in part on the signal from the telecoil, and wirelessly transmitting, to a wearable vision device, first display information to cause the vision device to display a representation of the telecoil information using a display device of the vision device, wherein the vision device further includes or defines a lens portion, wherein the vision device can be configured to be worn by the user so that the user looks through the lens portion, wherein the display device can be configured to display visual information to the user when the user can be wearing the vision device. a.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
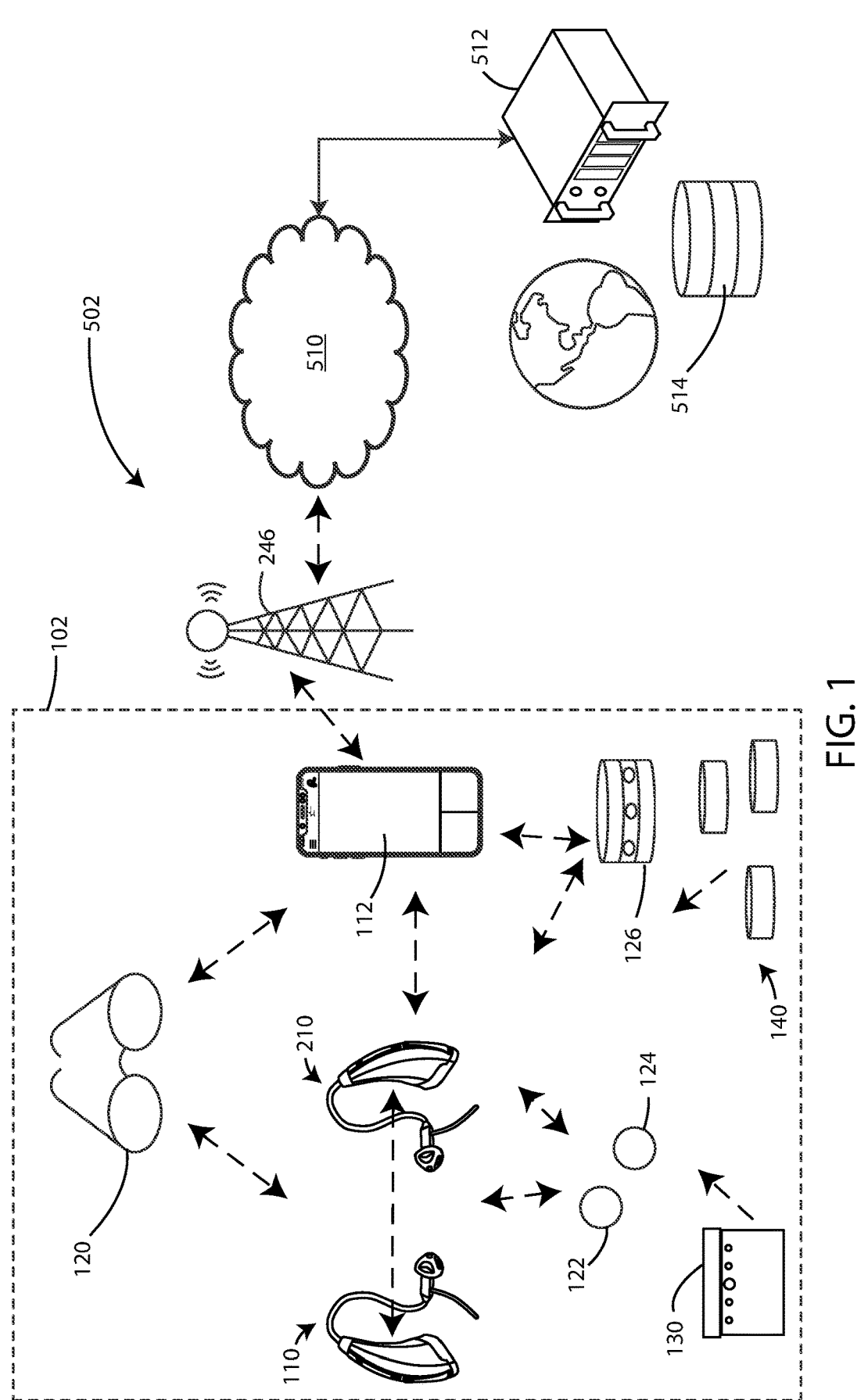
FIG. 1 is a schematic view of components of a hearing assistance system in accordance with various embodiments herein.
Figure 2:
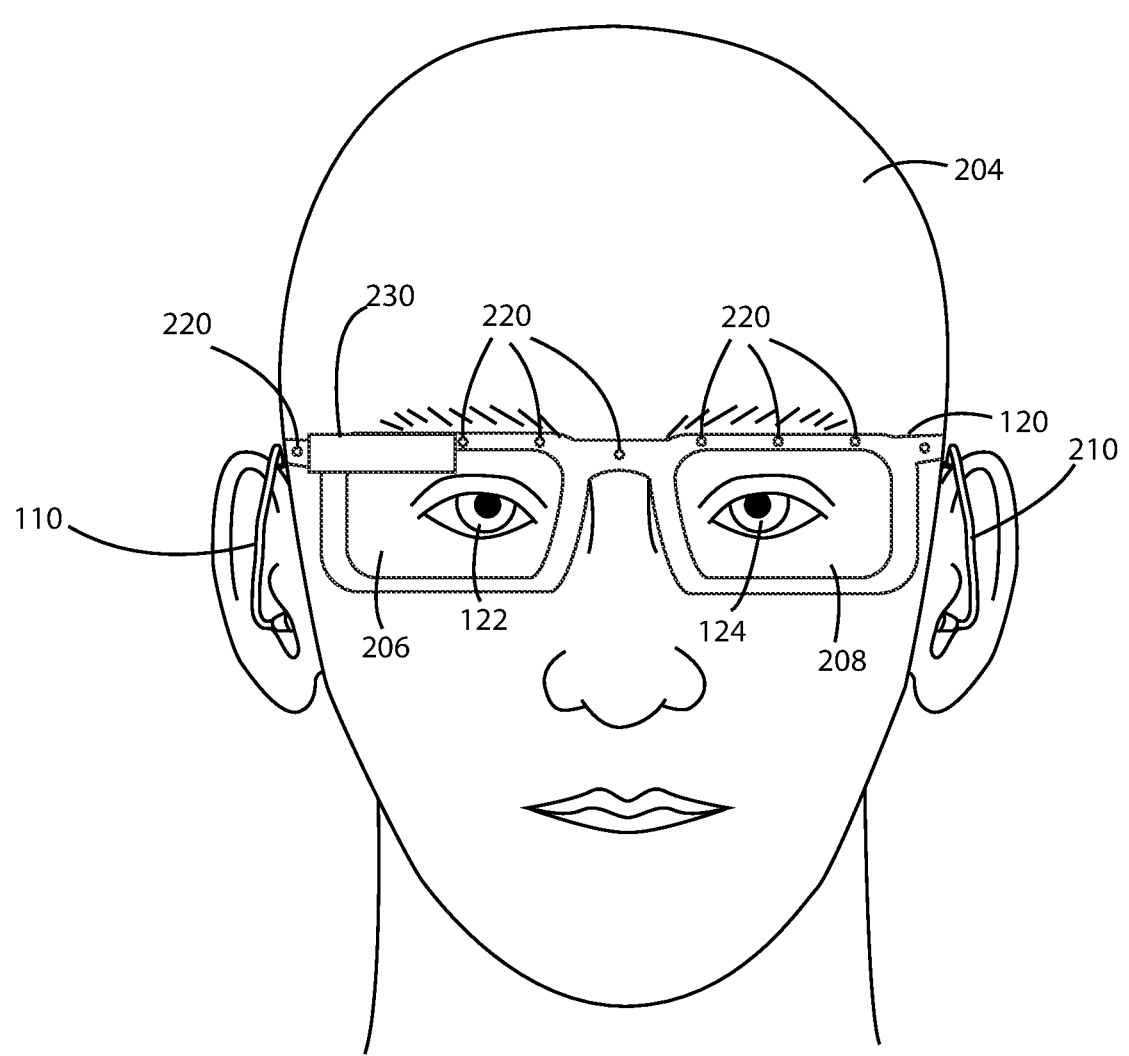
FIG. 2 is a front view of a user with ear-wearable devices and a wearable vision device in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Perceiving the direction of sound in their environment can be challenging for users of ear-wearable devices, such as hearing aids. Advances with signal processing technology, such as beamforming techniques, allow detection of the direction of a sound by systems using two or more microphones.

A system is described herein to support a user with a hearing impairment by providing both audio information and visual information about their surroundings. The system may include one or more ear-wearable devices, configured to generate sound, and a wearable vision device, such as augmented reality glasses or augmented reality contact lenses, configured to present visual information to the user. The system can also include a gateway device for wirelessly communicating with the one or more ear-wearable devices, the wearable vision device, and with remote computing resources.

The components of this embodiment can be configured to do much more than these functions. Further functions and subassemblies will be described herein and in the documents that are incorporated by reference. In some embodiments, the wearable vision device, the ear-wearable device, or both are configured to wirelessly communicate with remote computing resources, so that the gateway device is not required to be an intermediary for information from the devices of the system that can provide input information to detect the content of audio information, the direction of audio information, or otherwise support the user.

Multiple microphones in the system can collect multiple input audio streams of audio information in the user's environment. The system can be configured to wirelessly receive an input audio stream from each of the multiple microphones in the user's environment, to identify an audio content, and identify an audio direction. For example, the system can identify that a siren sound is present in the input audio stream and that the siren is coming from to the right of the user.

In addition, the gateway device itself can include a microphone and be configured to collect and send an audio stream to the system. The vision device and any ear-wearable devices can also include a microphone or multiple microphones.

The system can generate display information including a non-transcript content representation of the audio content information, such as words that describe the audio content information or a symbol that represents the audio content information. While a transcript of speech is often helpful for a hearing impaired person, information about the sounds other than speech in the audio environment can also be very valuable. For example, if the audio content is a siren, then the content representation can be the words "Siren" or "Emergency vehicle warning sound" or other descriptive words. Alternatively, or in addition, the content representation of the audio content information can be an icon or drawings of an emergency vehicle having a siren on top.

Non-transcript information about sounds in the audio environment can also be helpful. In another example of a content representation, the system can identify that a person is calling the name of the user. The system can store the name of the user and variations of the name of the user, such as nicknames, family relationship terms, or generic names. If one of these name is detected in the audio stream, the system can generate a content representation indicating the calling-sound that is occurring in the audio environment of the user. One example of such a non-transcript content representation is text describing the name-calling, such as, "Someone is calling your name," or "Someone is calling mom."

The display information can also include a direction representation of audio direction information. Examples of a direction representation include an arrow or other icon pointing toward or otherwise indicating a direction of the sound. Another example of a direction representation is text describing a direction of the sound, such as right, left, behind, ahead, or the like. Yet another example of a direction representation is tinting of a lens portion. A portion of the lens can be tinted in a direction opposite from the direction of the sound. A goal of this is to direct the user's gaze through an untinted portion of the lens that is closest to the origin of the sound.

Another example of a direction representation is a dynamic arrow that changes based on the gaze direction of the user. The gaze direction of the user can be detected using sensor devices on the wearable vision device, ear-wearable device, or both. In addition, or alternatively, the gaze direction can be determined using output from a camera of the vision device. A dynamic arrow can change to a circle or other symbol when the user is looking in the direction of the sound, can change to a left arrow when the sound is to the left of the user's gaze, can change to a right arrow when the sound is to the right of the user's gaze, and can change to a curved arrow or other symbol when the sound is behind the user's gaze direction.

The display information can be visually presented to the user via a display unit of the wearable vision device. The wearable vision device can be a contact lens configured to be worn on an eyeball of a user, a glasses device configured to be worn in front of at least one eye of the user, or can include both.

The hearing assistance system can further include a telecoil, such as a telecoil included in an ear-wearable device. The hearing assisting system can be configured to detect a first electromagnetic signal at the telecoil and analyze the first electromagnetic signal to determine an appliance in the user's environment that generated the first electromagnetic signal. For example, many common appliances and other electronic devices generate unique electromagnetic signals. Examples of appliances that generate electromagnetic signals include a stove, smoke alarm, toaster, and electric toothbrush. The hearing assistance system can transmit, to the vision device, telecoil display information to cause the vision device to display telecoil information using the display device. For example, the vision device could display, "Your stove is turned on," or "Your smoke alarm is active." This display of telecoil information can be presented via the display device of the vision device, with or without a representation audio content information and a direction representation.

Hearing Assistance System Including Ear-Wearable Device, Wearable Vision Device and Gateway Device (FIG. 1)

Hearing assistance systems herein can include many different components and devices. Referring now to FIG. 1, a schematic view of components of a hearing assistance system 502 is shown in accordance with various embodiments herein. In this example, the hearing assistance system 502 includes a first ear-worn device 110 and a second ear-worn device 210. The ear-worn devices 110, 210 are also referred to as ear-wearable devices.

The hearing assistance system 502 also includes a database 514 including information the ear-wearable devices, user profiles, and other information. In this example, the hearing assistance system 502 also includes a gateway device 112, also referred to as a personal communications device 112. However, it will be appreciated that other embodiments herein may lack a gateway device or personal communications device 112. Regardless, in some embodiments, a cell tower 246 can serve as a link to provide communication with a data conveyance/processing infrastructure. The hearing assistance system 502 also includes a server 512 (real or virtual). Components of the hearing assistance system 502 can be in communication with the server 512 and/or other components such as the database 514 through the cloud 510 (which can be a public or private data network, including but not limited to packet switched networks). In various embodiments, the database 514 can include information/records regarding spatial locations, spatial signals, other signals, referential devices, listening device services, and/or the like.

A personal communication device has a visual display screen. The personal communication device may also be referred to as a gateway device, and may have access to network resources, such as a cellular network or another wide area network. The gateway device has the ability to communicate wirelessly with the ear-wearable device. Examples of a gateway device include a smart phone, computer tablet, or laptop computer, cellular telephone, personal digital assistant, personal computer, streaming device, wide area network device, personal area network device, remote microphone, smart watch, home monitoring device, internet gateway, hearing device programmer, smart glasses, a captioning device, and combinations thereof, or the like. Hardware components consistent with various gateway devices are described in U.S. Pat. No. 10,657,042, titled "User Device including a Nonvolatile Memory Device and a Data Write Method Thereof," issued on May 19, 2020, the content of which is herein incorporated by reference. Hardware components, software components, and options for functionality of the system are described in U.S. Pat. No. 11,264,029, titled "Local Artificial Intelligence Assistant for Ear-Wearable Device," issued on Mar. 1, 2022, the content of which is incorporated herein by reference. Hardware components, software components, and options for functionality of the system are also described in U.S. Pat. No. 11,264,035, titled "Audio Signal Processing for Automatic Transcription using Ear-Wearable Device," issued on Mar. 1, 2022, the content of which are is incorporated herein by reference.

In some embodiments, the hearing assistance system 502 also includes a vision device, which could be a glasses 120, contact lenses 122, 124, or a combination thereof. In some embodiments, the hearing assistance system 502 also includes a microphone device 126, such as a table-top microphone device, including an array of spatially separated microphones.

Some devices that are part of the system 102, such as ear-wearable devices 110, 210, glasses 120, and contacts 122, 124 are worn in a fixed position relative to the user's head. As a result, at most times these devices are easily accessible to the user. It is also possible for the user to have or wear an accessory device, such as a smart watch. Some accessory devices can be worn so that they are fixed in relation to the user's body, such as a smart watch or a sensor device. A fixed relationship to the user's body allows the accessory device to be easily accessible to the user. The fixed relationship also enables the accessory device to include a sensor that can gather sensor data about the user and the user's movement. Accessory devices herein can include, but are not limited to, a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor, and combinations thereof, or the like. Hardware components consistent with various accessory devices are described in U.S. Pat. No. 11,264,035, titled "Audio Signal Processing for Automatic Transcription using Ear-Wearable Device," issued on Mar. 1, 2022, which is incorporated herein by reference.

It will be appreciated that data and/or signals can be exchanged between many different components in accordance with embodiments herein. Referring now to FIG. 1, a schematic view is shown of data and/or signal flow as part of a system in accordance with various embodiments herein. In a first location 102, a subject (not shown) can have a first hearing assistance device 110 and a second hearing assistance device 210. Each of the hearing assistance devices 110, 210 can include sensor packages as described herein including, for example, a motion sensor. The hearing assistance devices 110, 210 and sensors therein can be disposed on opposing lateral sides of the subject's head. The hearing assistance devices 110, 210 and sensors therein can be configured to be disposed in a fixed position relative to the subject's head. The hearing assistance devices 110, 210 and sensors therein can be configured to be disposed within opposing ear canals of the subject. The hearing assistance devices 110, 210 and sensors therein can be disposed on or in opposing ears of the subject. The hearing assistance devices 110, 210 and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing. The fixed relationship of the hearing assistance devices with respect to each other, and corresponding sensors they contain, can permit triangulation of voice signals.

In various embodiments, data and/or signals can be exchanged directly between the first hearing assistance device 110 and the second hearing assistance device 210. Data and/or signals can be exchanged wirelessly using various techniques including inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11 (wireless LANs) Wi-Fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

A gateway device 112 such as a smart phone, smart watch, internet gateway, or the like, can also be disposed within the first location 802. The gateway device 112 can exchange data and/or signals with one or both of the first hearing assistance device 110 and the second hearing assistance device 210 and/or with an accessory to the hearing assistance devices (e.g., a remote microphone, a remote control, a phone streamer, etc.).

Data and/or signals can be exchanged between the gateway device 112 and one or both of the hearing assistance devices (as well as from a gateway device to another location or device) using various techniques including, but not limited to inductive techniques (such as near-field magnetic induction—NFMI), 900 MHz communications, 2.4

GHz communications, communications at another frequency, FM, AM, SSB, BLUETOOTH™, Low Energy BLUETOOTH™, Long Range BLUETOOTH™, IEEE 802.11 (wireless LANs) Wi-Fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is also possible that forms of wireless mesh networks may be utilized to support communications between various devices, including devices worn by other individuals. It is understood that the standards which can be used include past and present standards. It is also contemplated that future versions of these standards and new future standards may be employed without departing from the scope of the present subject matter.

The gateway device 112 can also exchange data across a data network to the cloud 510, such as through a wireless signal connecting with a local display device, such as over a mesh network, such as a network router or through a wireless signal connecting with a cell tower 246 or similar communications tower. In some embodiments, the external visual display device can also connect to a data network to provide communication to the cloud 510 through a direct wired connection.

The hearing assisting system may further include one or more appliances 130 or electronic devices 140 that emit an electromagnetic signal. Examples of an appliance 130 include a stove, a refrigerator, a dishwasher, an electric toothbrush, a smoke detector, a security sensor, a carbon monoxide detector, a door bell, a washing machine for clothing, a dryer for clothing, a whirlpool, or a hot tub.

The hearing assisting system may further include a system of electronic devices 140, such as a system of smoke detectors located different rooms in a home.

Wearable Vision Devices (FIG. 2-7)

FIGS. 2-7 illustrate a variety of vision device options including glasses 120 and contact lenses 122, 124 that can be worn by a user 204. In various embodiments, the vision device includes a lens portion 206, 208 that the user looks through to perceive the user's surroundings. In various embodiments, the vision device defines a lens portion 206, 208 that the user looks through to perceive the user's surroundings. The lens portion may include a lens, such as made of glass or plastic material, or may be an opening or space that the user looks through.

In various embodiments, the lens portion includes a lens that is transparent or partially transparent, so that the user can perceive their environment by looking through the lens portion. In various embodiments, the lens portion may be defined on only one side of the glasses, such as in front of only one eye of the user, such as to only include lens portion 206 or lens portion 208. The vision device 120 may alternatively include two lens portions 206 and 208.

In various embodiments, the glasses 120 include one or more microphones 220, as will be discussed in greater detail herein. The glasses 120 also include a display device 230 that provides visual information to the user 204.

Figure 3:
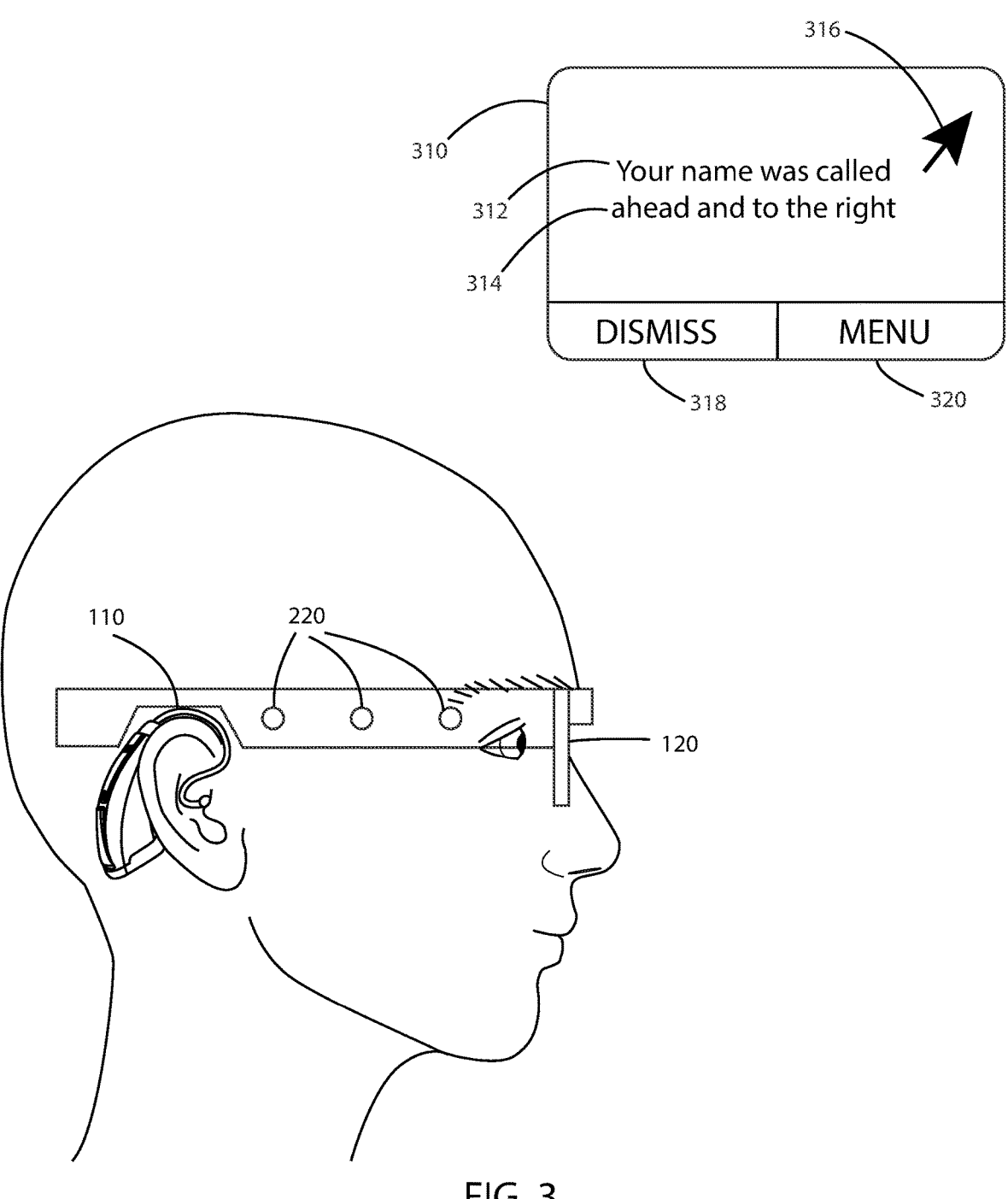
FIG. 3 is a side view of the user of FIG. 2 along with a display viewable by the user, in accordance with various embodiments herein.
Figure 4:
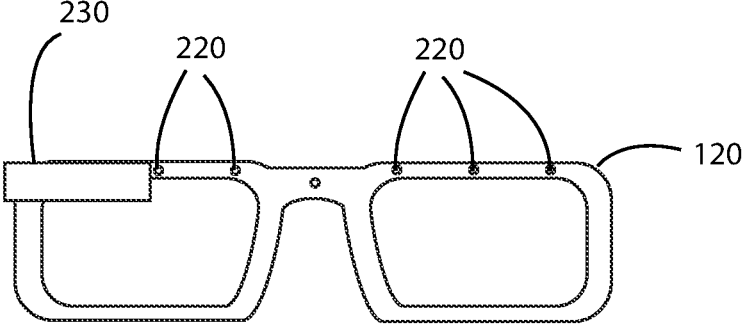
FIG. 4 is a front view of a wearable vision device in accordance with various embodiments herein.
Figure 5:
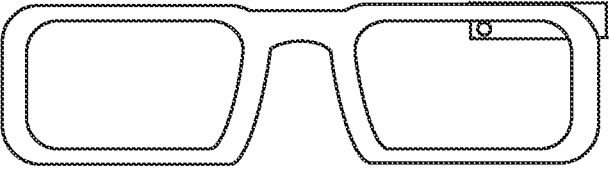
FIG. 5 is a rear view of a frame portion of a wearable vision device in accordance with various embodiments herein.
Figure 6:
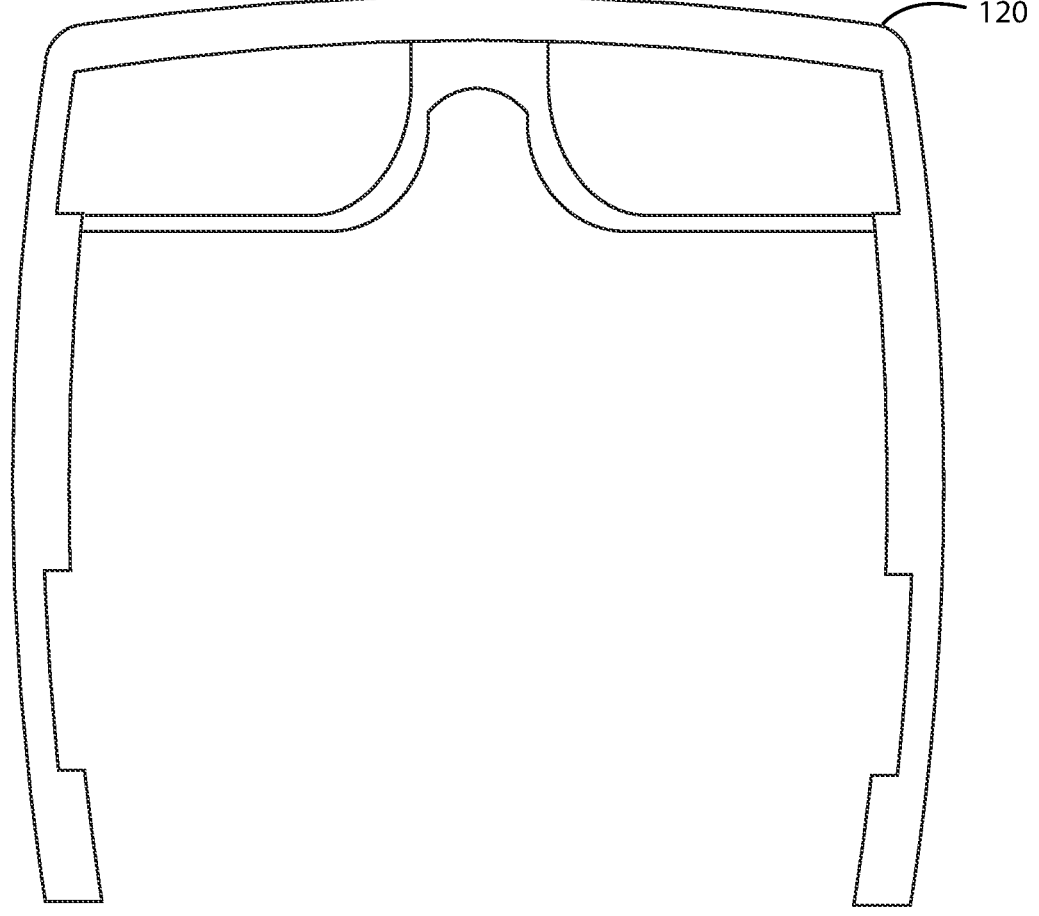
FIG. 6 is a top view of a wearable vision device in accordance with various embodiments herein.

FIG. 3 shows an example of display information 310 that can be provided to the user. The display information 310 includes a content representation of audio content 312, specifically, a text statement that the user's name was called. The display information 310 further includes a direction representation of the audio direction information 314, specifically, a text statement that the direction of the audio content 312 was ahead and to the right. The display information 310 further includes a second direction representation of the audio direction information 316, specifically, an arrow pointing ahead and to the right.

The display information 310 also includes a left menu option 318 and a right menu option 320 for interacting with the system to control the hearing assistance system. The menu options in this example are a command to dismiss the notification as the left menu option 318 or a command to view a menu of options for the system as the right menu option 320. The system can be configured to allow the user to execute the commands displayed by using a tap, double-tap, or other interaction with a right temple of the vision device, a left temple of the vision device, or a right ear-wearable device housing, a left ear-wearable device housing, in various examples. In one example, the left menu option 318 is selected by tapping on a left temple or left ear-wearable device and the right menu option 320 is selected by tapping on a right temple or right ear-wearable device.

Figure 7:
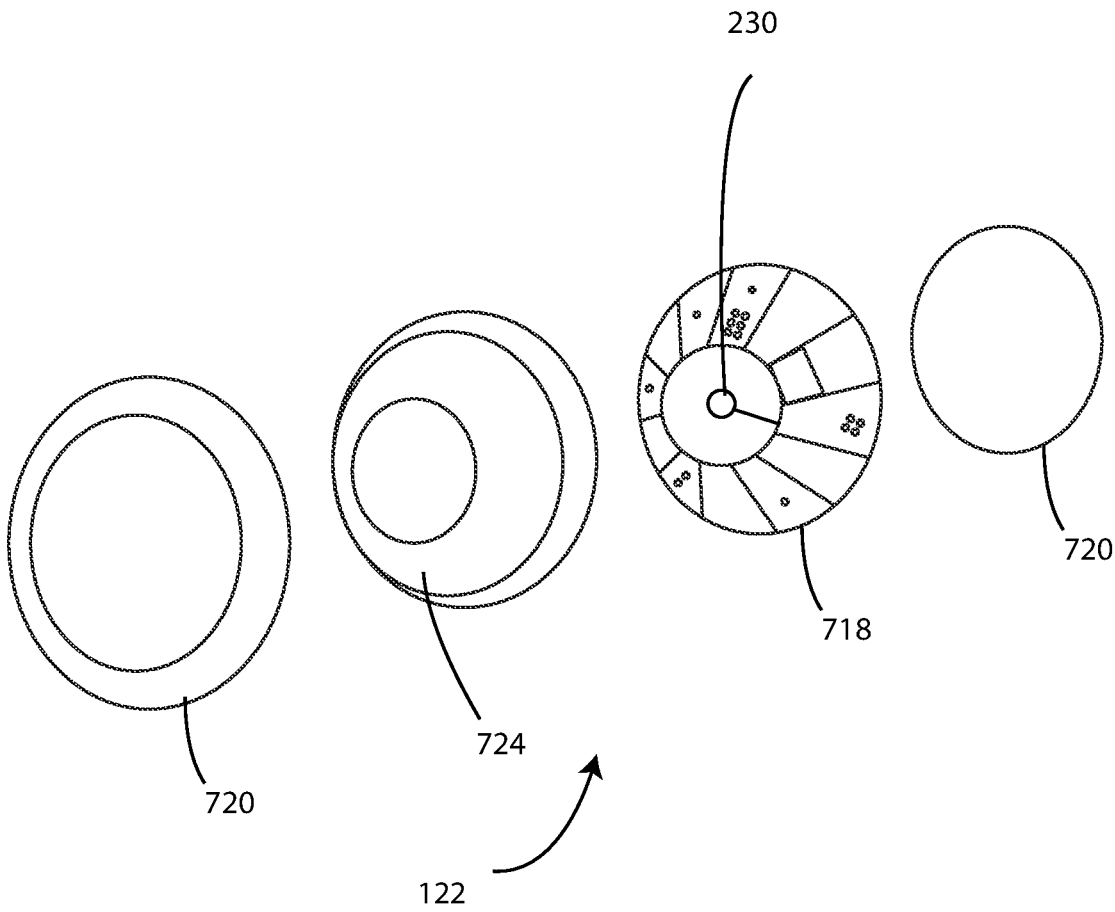
FIG. 7 is a perspective exploded view of a contact lens wearable vision device in accordance with various embodiments herein.

Contact Lenses (FIG. 7)

Contact lens 122 shown in FIG. 7 can include multiple layers including an electronic component layer 718, outer encasing layers 720, and a mask layer 724 that replicates the appearance of a user's eye. The electronic component layer 718 can include a display device 230 that provides visual information to the user. Contact lenses can also include a microphone. A first vision device microphone can be present on a first contact lens and a second vision device microphone can be present on a second contact lens. The spacing between the two microphones is known and this information can assist with audio processing to improve the quality of a transcript and other information about the audio input stream.

Processing Input Audio Streams

In various embodiments of the hearing assisting system, a first ear-wearable device includes a microphone. The first ear-wearable device is configured to receive a first input audio signal received at the first microphone during a first time period. In addition, the hearing assisting system includes a second microphone positioned to be spaced apart from the first microphone by at least 1 centimeter. The second microphone could also be included as a part of the first ear-wearable device, part of the vision device, part of a smart phone, part of a smart watch, or part of a separate structure.

The second microphone is configured to receive a second input audio signal during the first time period. The system is configured to process the first input audio signal and the second input audio signal to identify first audio content information. The hearing assisting system is further configured to process the first input audio signal and the second input audio signal to identify direction information related to the first audio content information. The direction information is the direction of the sound relative to the user, such as to the right, to the left, ahead, ahead and to the right, ahead and to the left, behind, behind and to the right, behind and to the left, above, below, or combinations of these directions.

Examples of Microphone Arrays in the Hearing Assisting System

In various embodiments, a hearing assisting system includes two or more microphones configured to be located at a fixed position on the user's body. One ear-wearable device can include two microphones, for example, such as on a front portion of an ear-wearable device and on a rear portion of the ear wearable device. In addition, or alternatively, a first microphone is provided on a first ear-wearable device and a second microphone is provided on a second ear-wearable device. In addition, or alternatively, a first microphone is provided on a first ear-wearable device and a second microphone is provided on a vision device. In addition, or alternatively, a first microphone is provided on a first ear-wearable device and a second microphone is provided on a smart watch or other accessory. Where two microphones are provided with the system, the system can be configured so that two microphones are spatially separated by at least 2 centimeters.

In various embodiments, a pair of glasses 120 can include multiple microphones at spaced intervals. Glasses 120 can include at least one of two microphones located on the vision device and spatially separated by at least 2 centimeters, three microphones located on the vision device and spatially separated by at least 1 centimeters, four microphones located on the vision device and spatially separated by at least 1 centimeters, five microphones located on the vision device and spatially separated by at least 1 centimeters, six microphones located on the vision device and spatially separated by at least 1 centimeters, seven microphones located on the vision device and spatially separated by at least 1 centimeters, eight microphones located on the vision device and spatially separated by at least 1 centimeters, In various embodiments, the glasses 120 includes an array of three vision device microphones, including a first vision device microphone located on a bridge of the glasses, a second vision device microphone located on a right end piece of the glasses, and a third vision device microphone located on a right end piece of the glasses, where the first, second, and third vision device microphones are spatially separated from each other by at least 1 centimeter.

In various embodiments, the glasses 120 include an array of five vision device microphones. The five vision device microphones can include a first vision device microphone located on a bridge of the glasses, a second vision device microphone located on a right end piece of the glasses, a third vision device microphone located on a right end piece of the glasses, a fourth vision device microphone located on a right temple of the glasses, a fifth vision device microphone located on a left temple of the glasses, where the first, second, third, fourth and fifth vision device microphones are spatially separated from each other by at least 1 centimeter.

In various embodiments, the glasses 120 include an array of seven vision device microphones. The seven vision device microphones can include a first vision device microphone located on a bridge of the glasses, a second vision device microphone located on a right end piece of the glasses, a third vision device microphone located on a right end piece of the glasses, a fourth vision device microphone located on a right temple of the glasses, a fifth vision device microphone located on a left temple of the glasses, a sixth vision device microphone located above a right lens of the glasses, a seventh vision device microphone located above a left lens of the glasses, where the first, second, third, fourth, fifth, sixth and seventh vision device microphones are spatially separated from each other by at least 1 centimeter.

Examples of Visual Information Presented on the Vision Device

A visual display can provide many types of information to a user about their audio environment. As illustrated in FIG. 3, the visual display 310 can include information about audio content 312, such as that the user's name was called, and the direction of the sound, such as ahead and to the right shown in text 314 and using arrow 316.

FIGS. 8-11 are examples of display information 310 that can be provided in various embodiments. References numbers will be used when referring to FIGS. 8-11 that are identical to the reference numbers in FIG. 3, although the content representations and direction representations are different in these examples. The display information 310 of FIGS. 8-10 each include a left menu option 318 to dismiss the notification and a right menu option 320 to view a menu.

Figure 8:
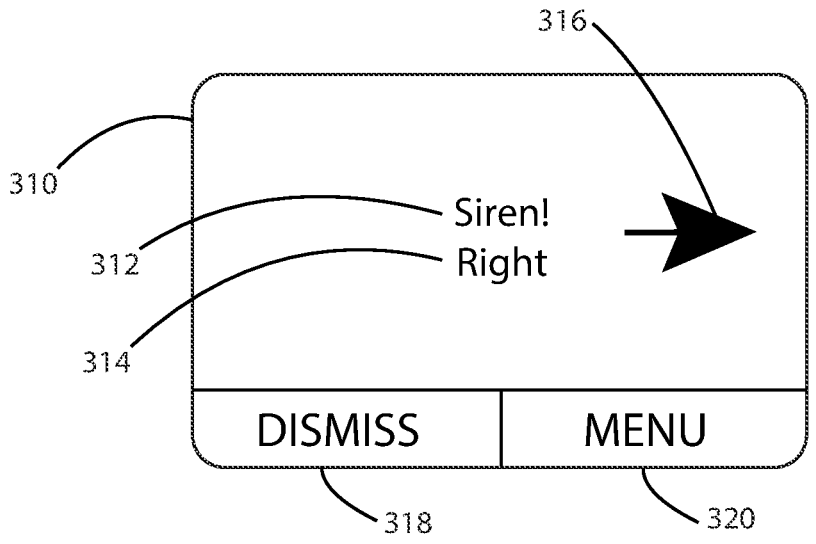
FIGS. 8-11 are views of a display of a wearable vision device in accordance with various embodiments herein.

In FIG. 8, the display information 310 includes a content representation of audio content 312 for a siren. The display information 310 further includes a direction representation of the audio direction information 314, specifically, a text statement that the direction of the audio content 312 is to the right. The display information 310 further includes a second direction representation of the audio direction information 316, specifically, an arrow pointing to the right.

Figure 9:
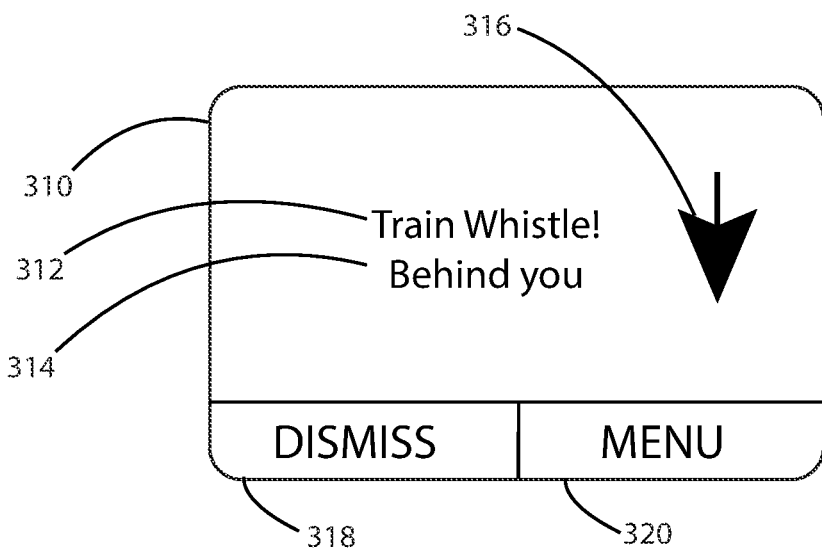

In FIG. 9, the display information 310 includes a content representation of audio content 312 for a train whistle. The display information 310 further includes a direction representation of the audio direction information 314, specifically, a text statement that the direction of the audio content 312 is behind the user, or "Behind you." The display information 310 further includes a second direction representation of the audio direction information 316, specifically, an arrow pointing down.

Figure 10:
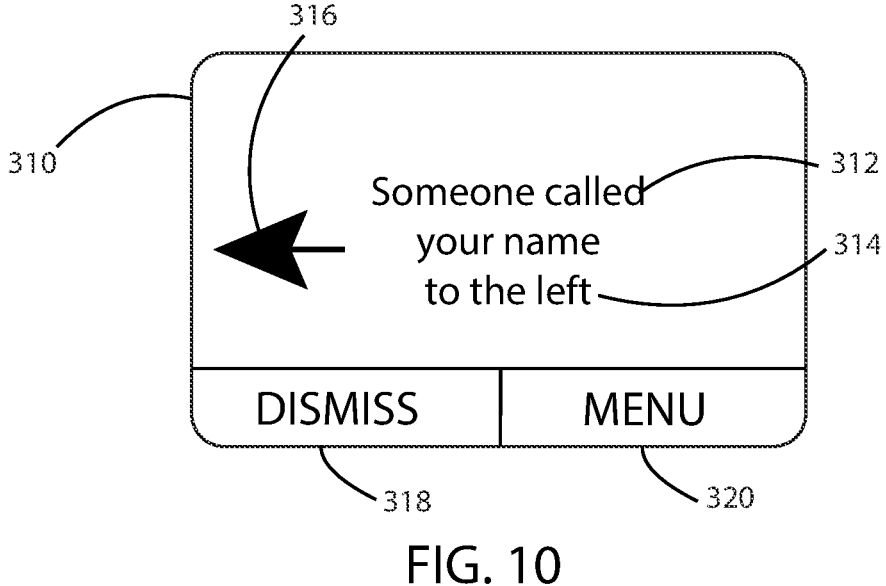

In FIG. 10, the display information 310 includes a content representation of audio content 312 for someone calling the user's name. The display information 310 further includes a direction representation of the audio direction information 314, specifically, a text statement that the direction of the audio content 312 is to the left. The display information 310 further includes a second direction representation of the audio direction information 316, specifically, an arrow pointing left.

To identify that a user's name was called during an audio input, the hearing assisting system can store an audio file of the sound of the user's name being called, as well as audio files of the user's name variations, nicknames, and family relationship names. The representation of audio content can be, "Someone was calling your name" or "Someone is yelling your name."

Figure 11:
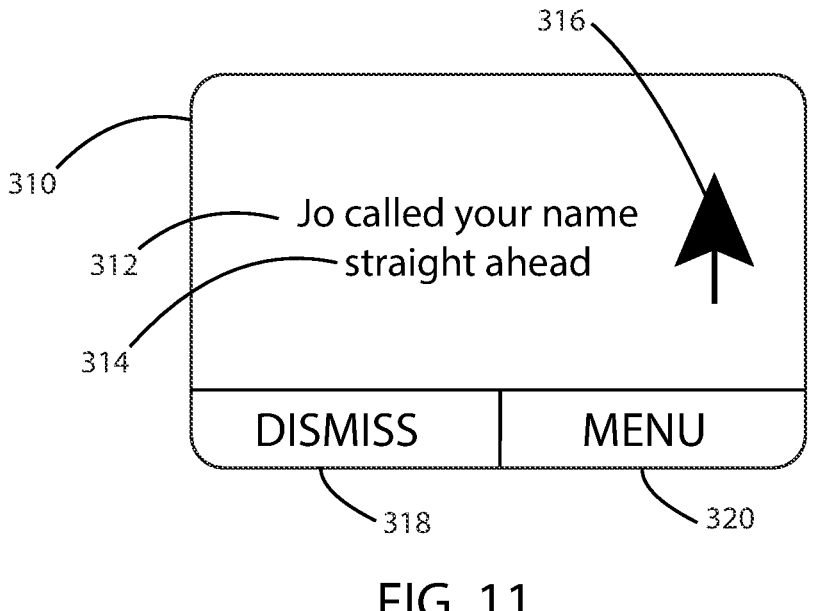

In FIG. 11, the display information 310 includes a content representation of audio content 312 for identifying a person who is calling the user's name. Specifically, the content representation is, "Jo called your name." The display information 310 further includes a direction representation of the audio direction information 314, specifically, a text statement that the direction of the audio content 312 is straight ahead. The display information 310 further includes a second direction representation of the audio direction information 316, specifically, an arrow pointing straight ahead.

In various embodiments, the hearing assisting system stores voice profiles for individuals that the user interacts with, along with a name and user relationship associated with the stored voice profile. The system can use these voice profiles to compare to a voice profile in the audio input, and through that comparison identify the person who is calling the user's name. If the voice calling the name can be identified, then the system can include that fact in the audio content information, such as by displaying, "Mom is calling your name," or, "Jo is calling your name."

In addition to audio content calling a user's name, examples of audio content that can be represented in the visual display using a non-transcript representation of audio information include information identifying a train whistle sound, a doorbell sound, an alarm sound, a battery status notification sound, a siren sound, a car honking sound, other vehicle notification sounds, tornado siren sounds, emergency notification sounds, reminder sounds, smoke alarm sounds, baby crying sounds, child crying sounds, footstep sounds, ice cream truck sounds, bicycle bell sounds, chirping sounds, barking sounds, meowing sounds, animal sounds, and security system sounds.

Figure 12:
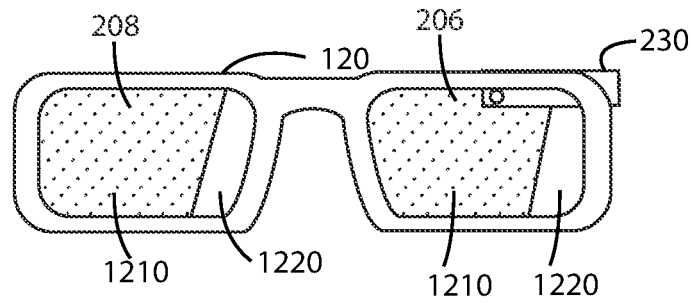
FIG. 12 is a rear view of a frame of a wearable vision device where the lenses provide an area of focus, in accordance with various embodiments herein.
Figure 13:
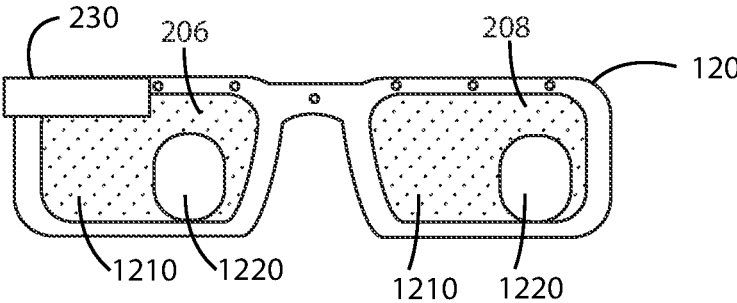
FIG. 13 is a front view of a wearable vision device where the lenses provide an area of focus, in accordance with various embodiments herein.
Figure 14:
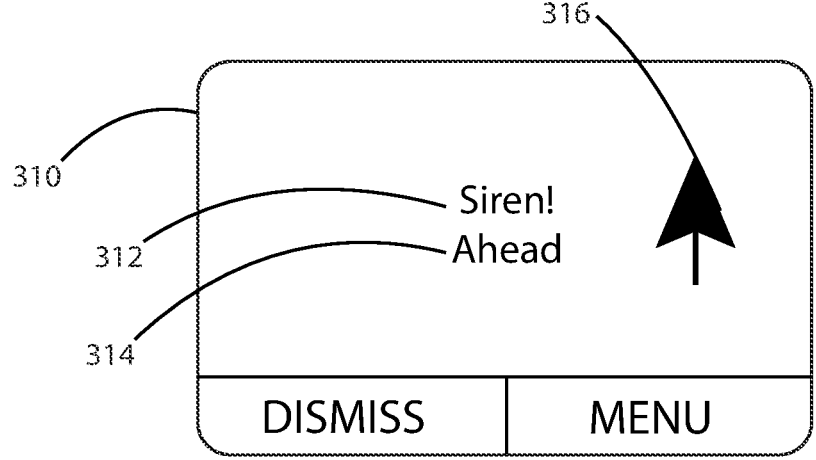
FIG. 14 is a rear view of a frame of a wearable vision device where tinting of the entire lenses is activated, along with a display viewable by the user, in accordance with various embodiments herein.
Figure 14:
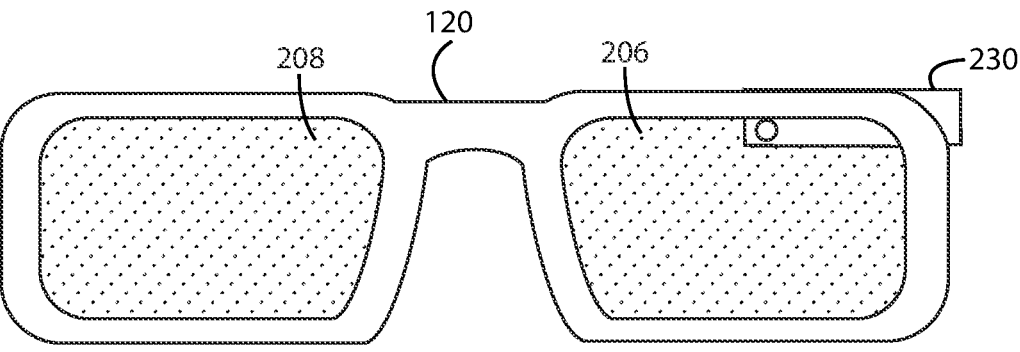

Tinting of the Lens Portion (FIGS. 12-14)

FIG. 12 is a rear view of a frame of a wearable vision device 120 including a display device 230, where the lenses provide an area of focus, in accordance with various embodiments herein. The lens portions 206 and 208 include a lens material that is configured to be capable of selective tinting controlled by a processor of the hearing assisting system. In various embodiments, the hearing assisting system is configured to provide a representation of location information or direction information by creating tinted portions 1210 of the lens, while leaving focus portions 1220 transparent without tinting, in order to direct the user's vision in the direction of the focus portions. The focus portions maybe a right side of the lens, a left side of the lens, an upper side of the lens, a lower side of the lens, or another portion of the lens.

FIG. 13 is a front view of a wearable vision device where the lenses provide an area of focus 1220 that is oval in shape, in accordance with various embodiments herein.

FIG. 14 is a rear view of a frame of a wearable vision device 120 where tinting of the entire lens portions 206, 208 is activated, along with a display viewable by the user, in accordance with various embodiments herein. In various embodiments, the hearing assisting system is configured to detect an emergency notification that needs immediate attention by the user, and in this scenario, to apply tinting to the entire lens portion for a first alert period of time. The tinting may be of a red color, yellow color, or other color designed to indicate to the user that an emergency notification needs their attention.

The display 310 includes a content representation 312 in the form of the word siren, and a direction representation 314 that the siren is located ahead of the user, and an additional direction representation 316 of an arrow pointing ahead.

In some embodiments, the first alert period can be greater than or equal to 1, 2, 3, 4, or 5 seconds. In some embodiments, the first alert period can be less than or equal to 10, 9, 8, 6, or 5 seconds. In some embodiments, the first alert period can fall within a range of 1 to 10 seconds, or 2 to 9 seconds, or 3 to 8 seconds, or 4 to 6 seconds, or can be about 5 seconds.

In various embodiments, the system is configured to present a color of tinting associated with different types of audio content information. For example, a first tint color can be associated with a first type of notification and a second tint color can be associated with a second type of notification. In various embodiments, a third tint color is associated with a third type of notification. Examples of types of notification or audio content include emergency notifications, different types of emergency notifications, name calling notifications, and telecoil notifications.

Figure 15:
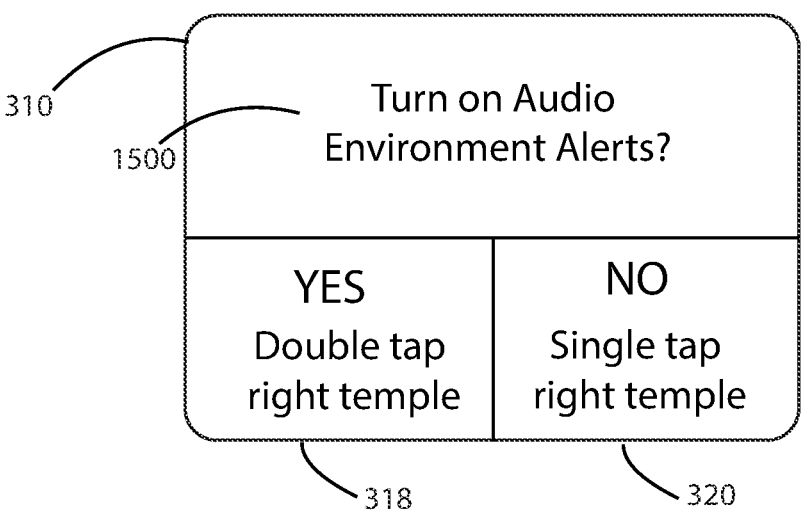
FIGS. 15-18 are views of a display of a wearable vision device in accordance with various embodiments herein.

Display for Control of the System (FIG. 15)

FIG. 15 is a view of a display of a wearable vision device in accordance with various embodiments herein, which can be used by the user to turn on audio environment alerts, such as the content notifications described herein. The display information 310 includes menu prompt 1500, asking if the user would like to turn on audio environment alerts.

The display information 310 also includes a left menu option 318 to respond yes and a right menu option 320 to respond no for interacting with the system to control the hearing assistance system. In various embodiments, one menu option can be selected by double tapping the right temple and other menu option can be selected by single tapping the left temple.

Figure 16:
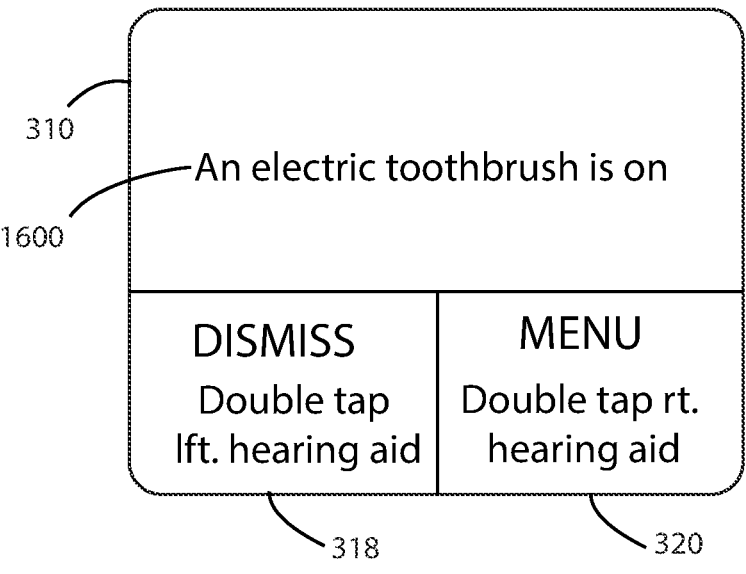
Figure 17:
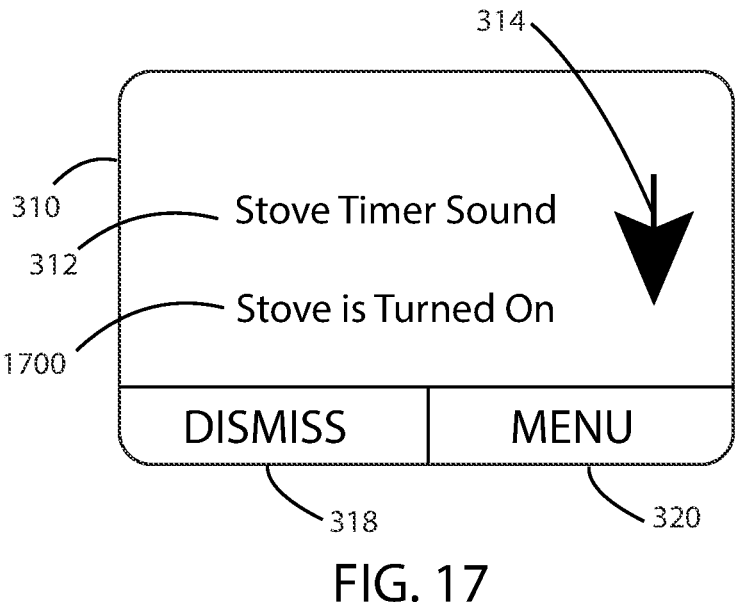
Figure 18:
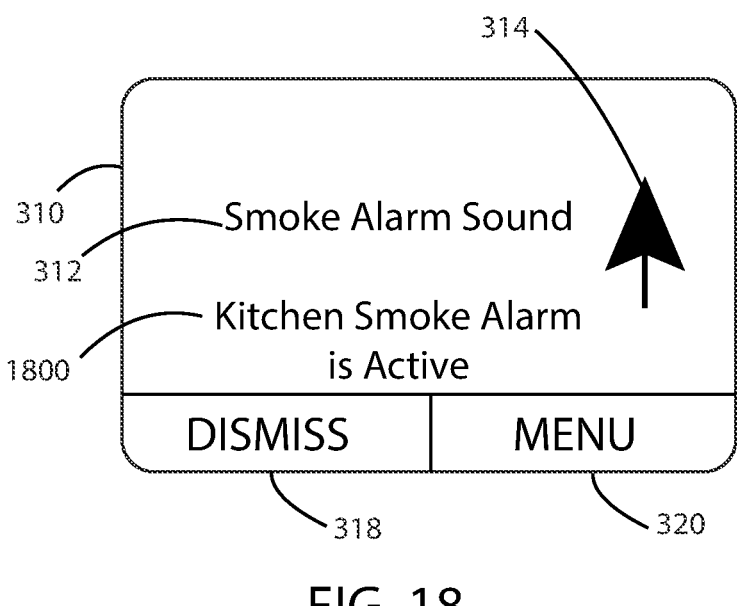

Telecoil Notifications (FIGS. 16-18)

FIGS. 16-18 are views of a display of a wearable vision device in accordance with various embodiments herein where information from a telecoil device is displayed to a user. A telecoil within an ear-worn device or vision device may be used to detect aspects of the user's environment, such as proximity to certain household appliances or electronic devices. This information can be presented to a user via a display device to help the user understand their audio environment.

FIG. 16 is a display 310 including a representation of telecoil information 1600, related to a presence of an electromagnetic signal in an environment of the ear-wearable device, based at least in part on a signal from a telecoil of the ear-wearable device. In FIG. 16, the system has determined that an electric toothbrush is on, and the representation of telecoil information 1600 includes the statement, "An electric toothbrush is on."

FIG. 17 is a display 310 including a representation of telecoil information 1700, related to a presence of an electromagnetic signal in an environment of the ear-wearable device, based at least in part on a signal from a telecoil of the ear-wearable device. In FIG. 17, the system has determined that a stove is turned on, and the representation of telecoil information 1700 includes the statement, "Stove is turned on."

The telecoil information can provide environmental context related to audio information that is displayed to the user. The display information 310 of FIG. 17 further includes a content representation of audio content 312 for a stove timer sound. The display information 310 further includes a direction representation of the audio direction information 314, specifically an arrow pointing down, indicating that the sound is coming from behind the user.

FIG. 18 is a display 310 including a representation of telecoil information 1800, related to a presence of an electromagnetic signal in an environment of the ear-wearable device, based at least in part on a signal from a telecoil of the ear-wearable device. In FIG. 17, the system has determined that a kitchen smoke alarm is active, and the representation of telecoil information 1800 includes the statement, "Kitchen Smoke Alarm is Active."

The display information 310 of FIG. 18 further includes a content representation of audio content 312 for a smoke alarm sound. The display information 310 further includes a direction representation of the audio direction information 314, specifically an arrow pointing up, indicating that the sound is coming from ahead of the user.

Another example of telecoil information is that an appliance has been on or active for over a threshold period of time. For example, the display device could display a message that the stove top burner has been on for over 30 minutes.

Further information regarding telecoil detection systems, appliances that can be detected by telecoils, and related inputs, outputs and processing steps can be found in co-pending U.S. Provisional Patent Application No. 63/364,779, titled "Use of Hearing Instrument Telecoils to Determine Contextual Information, Activities, or Modified Microphone Signals," filed on May 16, 2022, and incorporated by reference herein in its entirety.

Figure 19:
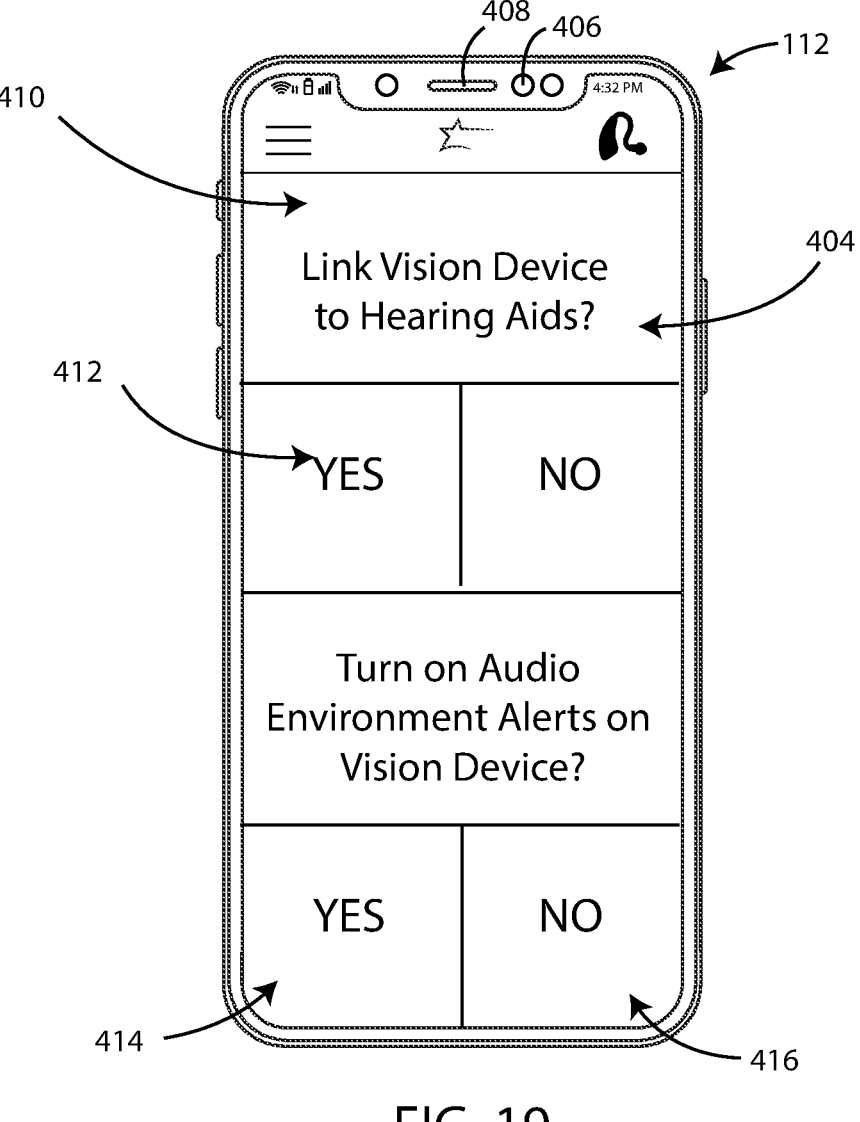
FIG. 19 is a view of a display of a gateway device in accordance with various embodiments herein.

Gateway Device/Personal Communication Device Interface Examples (FIG. 19)

Referring now to FIG. 19, a schematic view of a personal communications device 112 is shown in accordance with various embodiments herein. The personal communications device 112 includes a speaker 408 (though it will be appreciated that some embodiments of personal communications devices herein may lack various of the components described herein). The personal communications device 112 also includes a camera 406. The personal communications device 112 also includes a first user interface button 414 and a second user interface button 416. The personal communications device 112 also includes a display screen 404. The personal communications device 112 also includes a notification 410. The personal communications device 112 also includes a query 412.

In various embodiments, the hearing assistance system 502 prompts the ear-worn device 110 wearer to choose features and settings for components of the system, as shown in the FIGS. using displays on the personal communications device. Any of the visual information described herein as being provided on the personal communication device could also be shown using the vision device, and vice versa.

Haptic Outputs

Examples of system outputs that can be provided using the vision device or ear-wearable devices are described herein and include, in various embodiments, haptic feedback outputs indicating the direction of sound in the audio environment. Haptic feedback can take the form of vibration of particular ear-wearable devices or sides of the vision device to indicate the direction of sound. For example, an ear-wearable device located in a user's right ear, a right side of a vision device, or both can be configured to vibrate when the display of FIG. 8 is shown to the user describing that a siren has been detected to the right.

In various embodiments, the hearing assisting system can include one or more smart watchs, wristbands, arm bands, ankle bands, rings, or other wearable structures that can be positioned with one on a left side of a body and one on a right side of a body. A right body structure can provide haptic feedback when a sound comes from the right and a left body structure can provide haptic feedback when a sound comes from the left. A haptic feedback pulse can vary in strength, duration, or pattern to indicate different information about the audio environment.

In various embodiments, a first haptic feedback pattern indicates a first type of audio information while a second haptic feedback pattern indicates a second type of audio information. Examples of types of audio information include emergency notifications, types of emergency notifications, doorbells, name calling events, or telecoil information notifications.

Audio Processing Techniques Using Multiple Microphones

One or more microphones can be present on the wearable vision device, the ear-wearable device or devices, the gateway device, in a tabletop microphone, and in other locations. Some or all of the microphones in the system can have known spatial relationships. These microphones provide multiple input audio streams to the system. Multiple audio stream inputs from multiple microphones can improve audio processing using beamforming techniques, as described in U.S. Pat. No. 9,949,041B2 and U.S. Pat. No. 9,002,045B2 which are hereby incorporated by reference.

Environmental Processing

Detection of the environment can be used to prioritize portions of speech to transcribe. The following patent documents provide a description of environmental processing and are hereby incorporated by reference in their entireties, where the following list provides the publication number, the title, and the filing date of each document: US20200152227A1, Sound classification system for hearing aids, filed Jan. 13, 2020; U.S. Pat. No. 8,958,586B2, Sound environment classification by coordinated sensing using hearing assistance devices, filed Dec. 21, 2012; U.S. Ser. No. 10/129,664B2, User adjustment interface using remote computing resource, filed Apr. 15, 2016; WO2021138648A1, Ear-worn electronic device employing acoustic environment adaptation, filed Jan. 3, 2021; WO2021138647A1, Ear-worn electronic device employing acoustic environment adaptation, filed Jan. 3, 2021; U.S. Pat. No. 8,494,193B2, Environment detection and adaptation in hearing assistance devices, filed Mar. 14, 2006; U.S. Pat. No. 9,641,942B2, Method and apparatus for hearing assistance in multiple-talker settings, filed Aug. 31, 2015; and U.S. Pat. No. 9,197,970B2, Methods and apparatus for reducing ambient noise based on annoyance perception and modeling for hearing-impaired listeners, filed Sep. 27, 2012.

Figure 20:
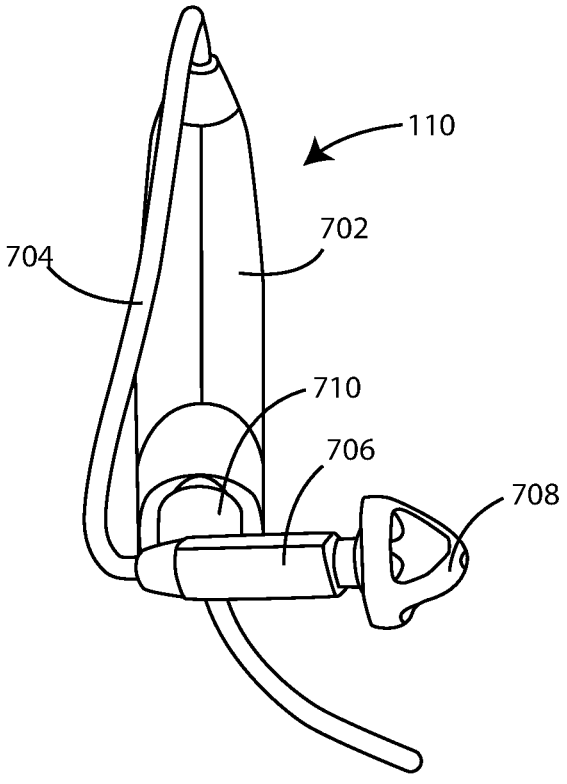
FIG. 20 is a schematic view of an ear-worn device in accordance with various embodiments herein.
Figure 21:
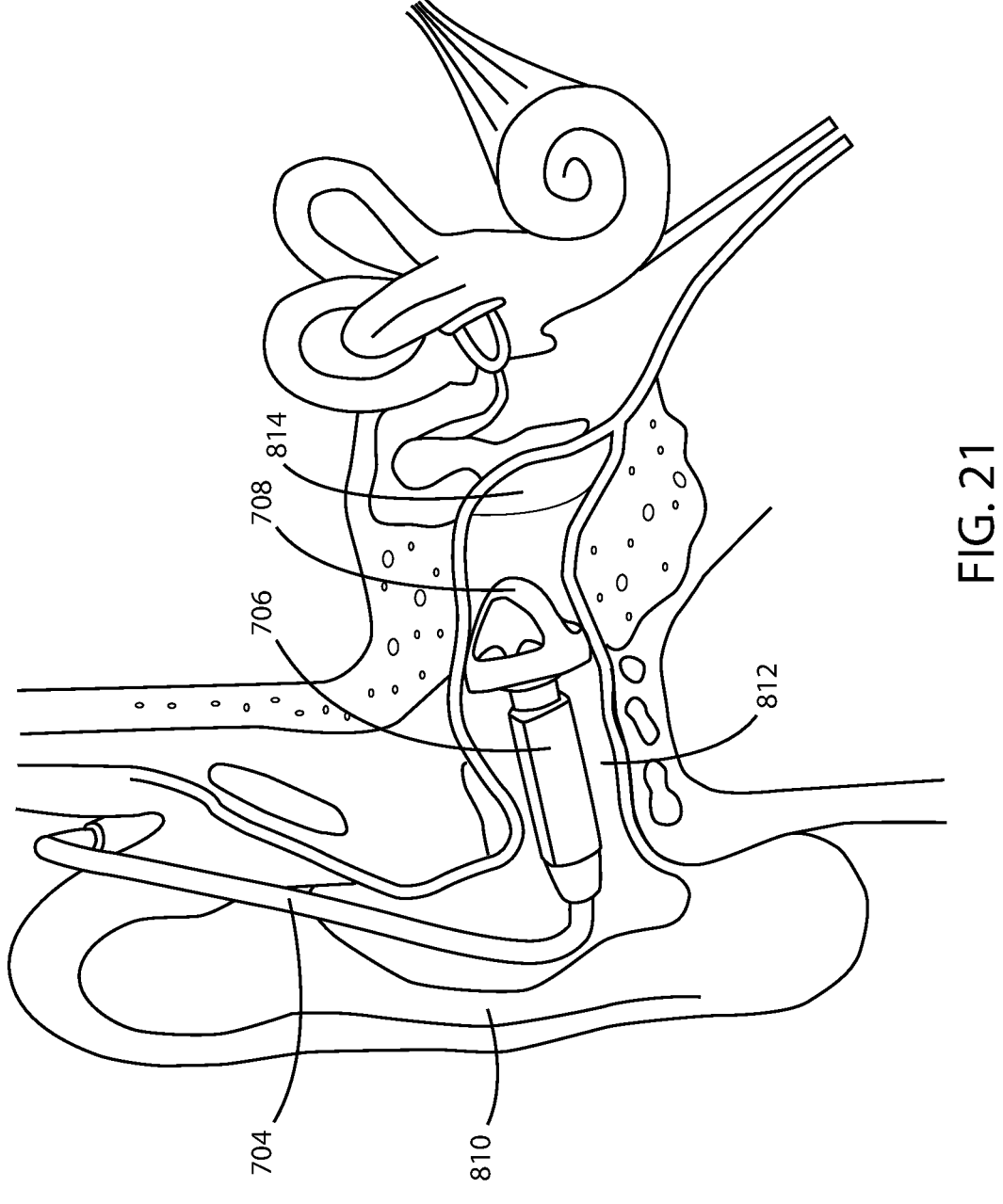
FIG. 21 is a schematic view of an ear-worn device within an ear of a device wearer in accordance with various embodiments herein.
Figure 22:
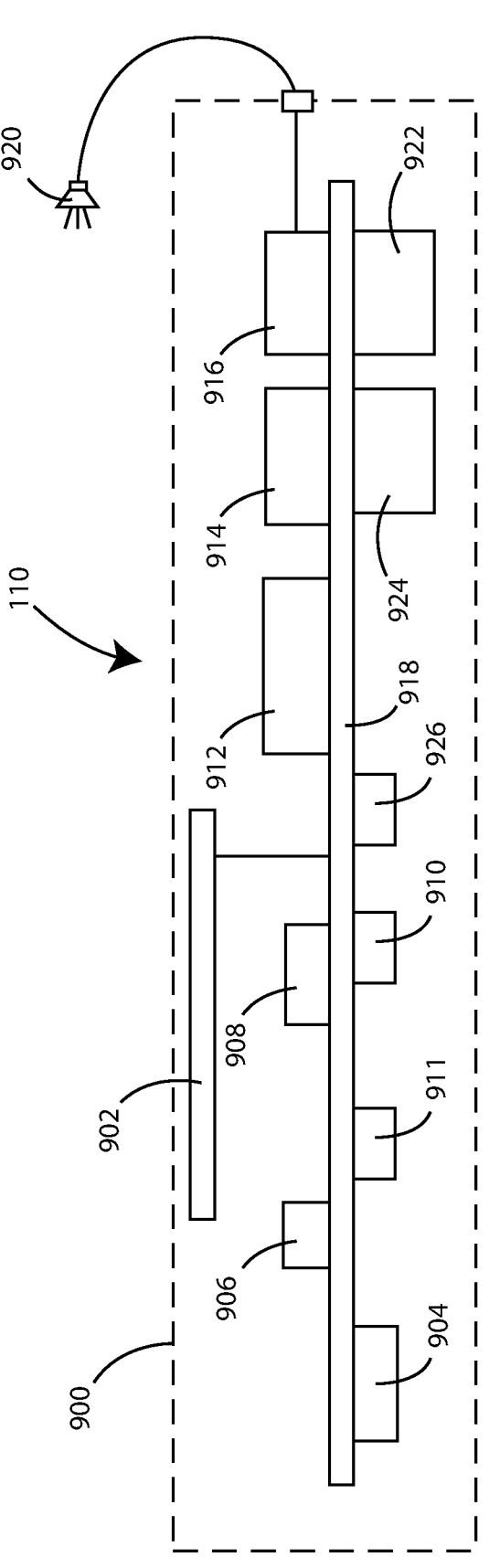
FIG. 22 is a schematic block diagram of components of an ear-worn device in accordance with various embodiments herein.

Ear-Wearable Device and Accessory Devices (FIGS. 20-22)

Referring now to FIG. 20, a schematic view of an ear-worn device 110 is shown in accordance with various embodiments herein. The ear-worn device 110 can include a hearing device housing 702. The hearing device housing 702 can define a battery compartment 710 into which a battery can be disposed to provide power to the device. The ear-worn device 110 can also include a receiver 706 adjacent to an earbud 708. The receiver 706 an include a component that converts electrical impulses into sound, such as an electroacoustic transducer, speaker, or loudspeaker. Such components can be used to generate an audible stimulus in various embodiments herein. A cable 704 or connecting wire can include one or more electrical conductors and provide electrical communication between components inside of the hearing device housing 702 and components inside of the receiver 706.

The ear-worn device 110 shown in FIG. 20 is a receiver-in-canal type device and thus the receiver is designed to be placed within the ear canal. However, it will be appreciated that may different form factors for ear-worn devices are contemplated herein. As such, ear-worn devices herein can include, but are not limited to, behind-the-ear (BTE), in-the-ear (ITE), in-the-canal (ITC), invisible-in-canal (IIC), receiver-in-canal (RIC), receiver in-the-ear (RITE) and completely-in-the-canal (CIC) type hearing assistance devices.

Ear-worn devices of the present disclosure can incorporate an antenna arrangement coupled to a high-frequency radio, such as a 2.4 GHz radio. The radio can conform to an IEEE 802.11 (e.g., WIFI®) or BLUETOOTH® (e.g., BLE, BLUETOOTH® 4, 2 or 5.0) specification, for example. It is understood that ear-worn devices of the present disclosure can employ other radios, such as a 900 MHz radio. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files.

As mentioned above, the ear-worn device 110 shown in FIG. 20 can be a receiver-in-canal type device and thus the receiver is designed to be placed within the ear canal. Referring now to FIG. 21, a schematic view is shown of an ear-worn device 110 disposed within the ear of a subject in accordance with various embodiments herein. In this view, the receiver 706 and the earbud 708 are both within the ear canal 812, but do not directly contact the tympanic membrane 814. The hearing device housing is mostly obscured in this view behind the pinna 810, but it can be seen that the cable 704 passes over the top of the pinna 810 and down to the entrance to the ear canal 812.

Referring now to FIG. 22, a schematic block diagram of components of an ear-worn device is shown in accordance with various embodiments herein. The block diagram of FIG. 22 represents a generic ear-worn device for purposes of illustration. The ear-worn device 110 shown in FIG. 22 includes several components electrically connected to a flexible mother circuit 918 (e.g., flexible mother board) which is disposed within housing 900. A power supply circuit 904 can include a battery and can be electrically connected to the flexible mother circuit 918 and provides power to the various components of the ear-worn device 110. One or more microphones 906 are electrically connected to the flexible mother circuit 918, which provides electrical communication between the microphones 906 and a digital signal processor (DSP) 912. Among other components, the DSP 912 incorporates or is coupled to audio signal processing circuitry configured to implement various functions described herein. A sensor package 914 can be coupled to the DSP 912 via the flexible mother circuit 918. The sensor package 914 can include one or more different specific types of sensors such as those described in greater detail below. One or more user switches 910 (e.g., on/off, volume, mic directional settings) are electrically coupled to the DSP 912 via the flexible mother circuit 918.

The ear-worn device 110 can further include a telecoil 911 which is configured to detect change in magnetic fields. The telecoil 911 can be active or passive. The telecoil 911 can include a metallic core around which a wire is coiled. When telecoils 911 are in a magnetic field, currents are induced in the wires, such as alternating currents induced in the presence of an alternating magnetic field. Typically, telecoils 911 are used to receive audio information from audio sources, such as telephones, inductive hearing loops, hearing assistive listening systems using neck loops, and so on. For instance, telecoils 911 may allow hearing instruments 110 (e.g., hearing aids, cochlear implants, etc.) to wirelessly pick up direct audio input from the magnetic fields produced by telephone receivers and hearing assistive listening systems using induction hearing loops or body-wearable loops, such as neck loops.

An audio output device 916 is electrically connected to the DSP 912 via the flexible mother circuit 918. In some embodiments, the audio output device 916 comprises a speaker (coupled to an amplifier). In other embodiments, the audio output device 916 comprises an amplifier coupled to an external receiver 920 adapted for positioning within an ear of a wearer. The external receiver 920 can include an electroacoustic transducer, speaker, or loud speaker. The ear-worn device 110 may incorporate a communication device 908 coupled to the flexible mother circuit 918 and to an antenna 902 directly or indirectly via the flexible mother circuit 918. The communication device 908 can be a BLUETOOTH® transceiver, such as a BLE (BLUETOOTH® low energy) transceiver or other transceiver(s) (e.g., an IEEE 802.11 compliant device). The communication device 908 can be configured to communicate with one or more external devices, such as those discussed previously, in accordance with various embodiments. In various embodiments, the communication device 908 can be configured to communicate with an external visual display device such as a smart phone, a video display screen, a tablet, a computer, or the like.

In various embodiments, the ear-worn device 110 can also include a control circuit 922 and a memory storage device 924. The control circuit 922 can be in electrical communication with other components of the device. In some embodiments, a clock circuit 926 can be in electrical communication with the control circuit. The control circuit 922 can execute various operations, such as those described herein. The control circuit 922 can include various components including, but not limited to, a microprocessor, a microcontroller, an FPGA (field-programmable gate array) processing device, an ASIC (application specific integrated circuit), or the like. The memory storage device 924 can include both volatile and non-volatile memory. The memory storage device 924 can include ROM, RAM, flash memory, EEPROM, SSD devices, NAND chips, and the like. The memory storage device 924 can be used to store data from sensors as described herein and/or processed data generated using data from sensors as described herein.

It will be appreciated that various of the components described in FIG. 22 can be associated with separate devices and/or accessory devices to the ear-worn device. By way of example, microphones can be associated with separate devices and/or accessory devices. Similarly, audio output devices can be associated with separate devices and/or accessory devices to the ear-worn device.

Accessory devices herein can include various different components. In some embodiments, the accessory device can be a personal communications device, such as a smartphone. However, the accessory device can also be other things such as a wearable device, a handheld computing device, a dedicated location determining device (such as a handheld GPS unit), or the like.

Figure 23:
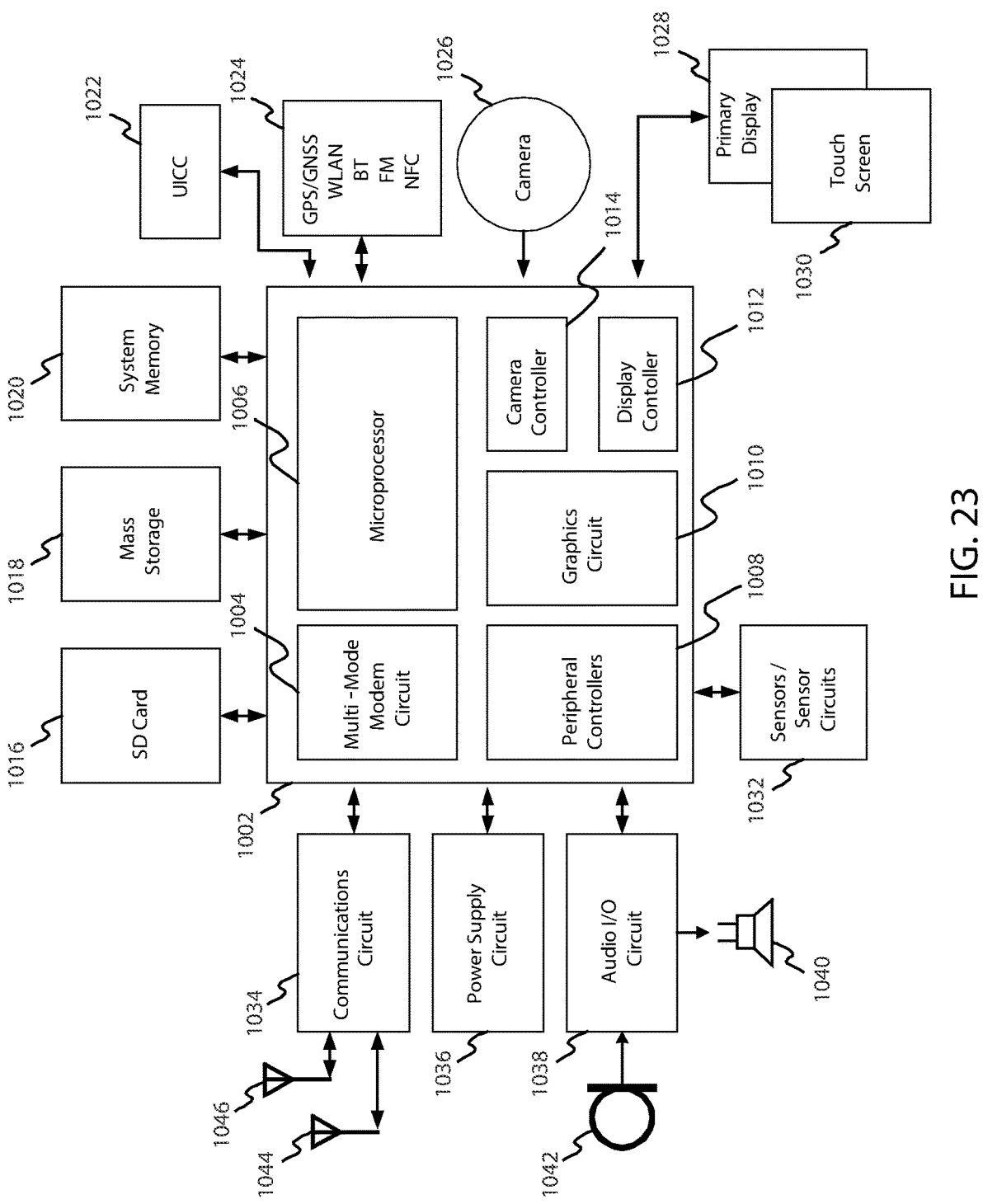
FIG. 23 is a schematic block diagram of components of an exemplary device in accordance with various embodiments herein.

Referring now to FIG. 23, a schematic block diagram is shown of components of an accessory device (which could be a personal communications device, a gateway device, a display device, a tabletop microphone, a vision device, a smart watch, or another type of accessory device) in accordance with various embodiments herein. This block diagram is just provided by way of illustration and it will be appreciated that accessory devices can include greater or lesser numbers of components. The accessory device in this example can include a control circuit 1002. The control circuit 1002 can include various components which may or may not be integrated. In various embodiments, the control circuit 1002 can include a microprocessor 1006, which could also be a microcontroller, FPGA, ASIC, or the like. The control circuit 1002 can also include a multi-mode modem circuit 1004 which can provide communications capability via various wired and wireless standards. The control circuit 1002 can also include various sensors/sensor circuits 1032. The control circuit 1002 can also include peripheral controllers 1008, a graphics circuit 1010, a camera controller 1014, and a display controller 1012. In various embodiments, the control circuit 1002 can interface with an SD card 1016, mass storage 1018, and system memory 1020. In various embodiments, the control circuit 1002 can interface with universal integrated circuit card (UICC) 1022. A spatial location determining circuit can be included and can take the form of an integrated circuit 1024 that can include components for receiving signals from GPS, GLONASS, BeiDou, Galileo, SBAS, WLAN, BT, FM, and NFC type protocols. In various embodiments, the accessory device can include a camera 1026. In various embodiments, the control circuit 1002 can interface with a primary display 1028 that can also include a touch screen 1030. In various embodiments, an audio I/O circuit 1038 can interface with the control circuit 1002 as well as a microphone 1042 and a speaker 1040. In various embodiments, a power supply circuit 1036 can interface with the control circuit 1002 and/or various other circuits herein in order to provide power to the system. In various embodiments, a communications circuit 1034 can be in communication with the control circuit 1002 as well as one or more antennas (1044, 1046).

Sensors

Systems herein can include one or more sensor packages. The sensors can provide input to the system to improve the function of the system. For example, the sensor can receive input from the user or obtain information about the environment. Sensors can determine aspects including, but not limited to, tracking movement of a subject and tracking head position of the subject. Such movement can be detected and used as user input to the system. For example, a head nod can indicate that the user would like to answer yes to a question asked by the system. The user's head movement as the user follows a conversation can also help the system determine which speaker is associated with a particular voice signal.

The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. Motions sensors can be used to track movement of a subject in accordance with various embodiments herein.

In some embodiments, an IMU is present in an ear-wearable device. In some embodiments, an IMU is present in each of two ear-wearable devices that are worn together by a user. In some embodiments, the motion sensors can be disposed in a fixed position with respect to the head of a subject, such as worn on or near the head or ears. In some embodiments, the motion sensors can be disposed associated with another part of the body such as on a wrist, arm, or leg of the subject.

Sensor packages herein can also include one or more of a magnetometer, microphone, acoustic sensor, or eye movement sensor (e.g., electrooculogram (EOG) sensor).

In some embodiments, the sensor package can be part of a hearing assistance device. However, in some embodiments, the sensor packages can include one or more additional sensors that are external to a hearing assistance device. The one or more additional sensors can comprise one or more of an IMU, accelerometer, gyroscope, barometer, magnetometer, an acoustic sensor, or eye motion tracker. For example, the one or more additional sensors can include a wrist-worn or ankle-worn sensor package, a sensor package supported by a chest strap, a sensor package integrated into a medical treatment delivery system, or a sensor package worn inside the mouth.

The sensor package of a hearing assistance device can be configured to sense motion of the wearer. Data produced by the sensor(s) of the sensor package can be operated on by a processor of the device or system.

According to various embodiments, the sensor package can include one or more of an IMU, and accelerometer (3, 6, or 9 axis), a gyroscope, a barometer, an altimeter, a magnetometer, an eye movement sensor, a pressure sensor, an optical sensor, and the like.

As used herein the term "inertial measurement unit" or "IMU" shall refer to an electronic device that can generate signals related to a body's specific force and/or angular rate. IMUs herein can include one or more of an accelerometer and gyroscope (3, 6, or 9 axis) to detect linear acceleration and a gyroscope to detect rotational rate. In some embodiments, an IMU can also include a magnetometer to detect a magnetic field. In some embodiments, an IMU can also include a barometer.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

The sensor package can include one or more sensors that are external to the hearing assistance device. In addition to the external sensors discussed hereinabove, the sensor package can comprise a network of body sensors (such as those listed above) that sense movement of a multiplicity of body parts (e.g., arms, legs, torso).

Definition of Transcript and Non-Transcript

As used herein, the term transcript will be used to refer to a printed, displayed, or otherwise visually presented text of speech linked to audio information and including the words of the speech present in the audio information. The term non-transcript will be used to refer to information that is not the words of speech information. Non-limiting examples of non-transcript information about audio content include words, letters, or symbols describing speech or describing non-speech sounds.

For example, where an audio input includes a voice is calling, "John, look behind you," a first text "John, look behind you," is transcript information, while a second text, "Someone is calling your name" is non-transcript information, because it is different than the words of speech found in the audio input. Similarly, text stating "A baby is crying," "A child is crying," "A doorbell is ringing," or "Jo called your name," is non-transcript information, because it describes non-speech sounds.

Methods

Many different methods are contemplated herein, including, but not limited to, methods of making, methods of using, and the like. Aspects of system/device operation described elsewhere herein can be performed as operations of one or more methods in accordance with various embodiments herein.

In various embodiments, operations described herein and method steps can be performed as part of a computer-implemented method executed by one or more processors of one or more computing devices. In various embodiments, operations described herein and method steps can be implemented using instructions stored on a non-transitory, computer-readable medium that, when executed by one or more processors, cause a system to execute the operations and/or steps.

In an embodiment, a method is included, the method receiving a first audio signal at a first microphone of an ear-wearable device of a hearing assisting system, receiving a second audio signal at a second microphone of the hearing assisting system, wherein the first audio signal and second audio signal comprise first audio information from a first time period.

The method further includes processing, by a processing system that includes one or more processors, the first input audio signal and the second input audio signal to identify first audio content information and first audio direction information related to the first audio content information.

Multiple processors are present in the parts of the various embodiments of hearing assisting systems described herein, and many options exist for performing the processing steps. The processing steps can be carried out by one or more of a processor of a first ear-wearable device, a second ear-wearable device, a vision device, a gateway device, a smart watch, or other components in the system.

The method further includes wirelessly transmitting, to a wearable vision device, first display information to cause the vision device to display a non-transcript content representation of the first audio content information and a direction representation of the first audio direction information using a display device of the vision device. The vision device further comprises or defines a lens portion, wherein the vision device is configured to be worn by a user so that the user looks through the lens portion, wherein the display device is configured to display visual information to the user when the user is wearing the vision device.

In an embodiment, the method can further include identifying, by a processing system that includes one or more processors, a presence of a first emergency notification sound as the first audio content information within the first audio content information. The method can further include, upon identifying the presence of the first emergency notification sound, the content representation will identify the first emergency notification sound. Examples of an emergency notification sound include a siren, an emergency vehicle siren, a tornado siren, an emergency weather siren, a public safety siren, a horn, a train whistle, a train horn, a vehicle horn, a smoke alarm, a fire alarm, a carbon-monoxide alarm, and a law enforcement announcement.

In an embodiment, the method can further include identifying, by the processing system, a name call as the first audio content information within the first audio content information, wherein a memory system can include one or more memory devices stores instructions can include a user name and user name variations.

In an embodiment of the method, the first ear-wearable device further comprises a telecoil, further can include detecting a first electromagnetic signal at the telecoil, analyzing, using the processing system, the first electromagnetic signal to determine telecoil information related to a presence of an appliance that generated the first electromagnetic signal in an environment of the ear-wearable device, and transmitting, to the vision device, telecoil display information to cause the vision device to display a representation of telecoil information using the display device.

In an embodiment, a method includes obtaining, by a processing system that includes one or more processors implemented in circuitry, a signal from a telecoil of an ear-wearable device, wherein the ear-wearable device. The method further includes determining, by the processing system, telecoil information related to a presence of an electromagnetic signal in an environment of the ear-wearable device, based at least in part on the signal from the telecoil, and wirelessly transmitting, to a wearable vision device, first display information to cause the vision device to display a representation of the telecoil information using a display device of the vision device, wherein the vision device further comprises or defines a lens portion, wherein the vision device is configured to be worn by the user so that the user looks through the lens portion, wherein the display device is configured to display visual information to the user when the user is wearing the vision device.

INCORPORATIONS BY REFERENCE

The following patent applications and patent documents are hereby incorporated by reference in their entirety to illustrate system inputs, system outputs, processing techniques, user displays, hardware environments and other features can be used with the hearing assisting system described herein: U.S. Provisional Appl. 63/218,735, Context-based User Availability for Notifications, filed Jul. 6, 2021; U.S. Pat. No. 9,042,586B2, Method and apparatus for own-voice sensing in a hearing assistance device, filed Aug. 13, 2013; U.S. Pat. No. 9,699,573B2, Hearing assistance system with own voice detection, filed Jul. 27, 2015; US20200152227A1, Sound classification system for hearing aids, filed Jan. 13, 2020; U.S. Pat. No. 8,958,586B2, Sound environment classification by coordinated sensing using hearing assistance devices, filed Dec. 21, 2012; U.S. Ser. No. 10/129,664B2, User adjustment interface using remote computing resource, filed Apr. 15, 2016; WO2021138648A1, Ear-worn electronic device employing acoustic environment adaptation, filed Jan. 3, 2021; WO2021138647A1, Ear-worn electronic device employing acoustic environment adaptation, filed Jan. 3, 2021; U.S. Pat. No. 8,494,193B2, Environment detection and adaptation in hearing assistance devices, filed Mar. 14, 2006; U.S. Pat. No. 9,641,942B2, Method and apparatus for hearing assistance in multiple-talker settings, filed Aug. 31, 2015; U.S. Pat. No. 9,197,970B2, Methods and apparatus for reducing ambient noise based on annoyance perception and modeling for hearing-impaired listeners, filed Sep. 27, 2012; U.S. Pat. No. 9,949,041B2, Hearing assistance device with beamformer optimized using a priori spatial information, filed Aug. 6, 2015; U.S. Pat. No. 9,002,045B2, Hearing aids with adaptive beamformer responsive to off-axis speech, filed Dec. 28, 2012; and U.S. Pat. No. 9,264,824B2, Integration of hearing aids with smart glasses to improve intelligibility in noise, filed Jul. 31, 2013.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure.

Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A hearing assisting system comprising:
  a. a first ear-wearable device, the first ear-wearable device comprising a first microphone at a first microphone location, the first ear-wearable device further comprising:
    a hearing device housing, the hearing device housing comprising:
      a battery compartment comprising a battery;
      a flexible mother circuit comprising and electrically connected to:
        a digital signal processor;
        an audio output device electrically connected to the digital signal processor;
        a plurality of user switches electrically connected to the digital signal processor, wherein the user switches control volume and on/off;
        an inertial measurement unit (IMU) sensor; and
        a first memory storage device configured to store data from the IMU sensor;
    a first transducer electrically connected to the audio output device and configured to be positioned within an ear of a user; and
    a cable comprising one or more electrical conductors, the cable configured to provide electrical communication between the hearing device housing and the first transducer;
  wherein the first ear-wearable device is configured to:
    be worn by the user in contact with the ear of the user;
    direct sound from the first transducer toward the user's ear when the first ear-wearable device is worn by the user; and
    wirelessly transmit a first input audio signal received at the first microphone at the first microphone location;
  b. a vision device, the vision device comprising or defining a lens portion, wherein the vision device is configured to be worn by the user so that the user looks through the lens portion, the vision device further comprising a display device, wherein the display device is configured to display visual information to the user when the user is wearing the vision device,
  c. a second microphone, wherein the second microphone is configured to be positioned at a second microphone location;
  wherein the hearing assisting system is configured to store computer instructions for:
    receiving, from the first microphone, the first input audio signal;
    receiving, from the second microphone, a second input audio signal, wherein the first audio input signal and the second audio input signal both comprise first audio information from a first time period;
    processing the first input audio signal and the second input audio signal to identify first audio content information and first audio direction information related to the first audio content information; and wirelessly transmitting, to the vision device, first display information to cause the vision device to display a non-transcript content representation of the first audio content information and a direction representation of the first audio direction information using the display device;

wherein the display information comprises at least one menu prompt to control the first ear-wearable device, and wherein the hearing assisting system is configured to receive user input to execute the at least one menu prompt displayed, and wherein the at least one menu prompt is executed by the user tapping on the first ear-wearable device.

2. The hearing assisting system of claim 1, wherein the first ear-wearable device further comprises:

a first control circuit, the first transducer, wherein the first transducer is configured to generate sound and is in electrical communication with the first control circuit, the first microphone, wherein the first microphone is in electrical communication with the first control circuit, the first memory storage, and a first wireless communication device;

wherein the vision device further comprises:

a vision device control circuit, a vision device wireless communication device, a vision device camera, and a vision device memory, wherein the vision device wireless communication device is configured to receive the first display information.

3. The hearing assisting system of claim 1, further comprising a second ear-wearable device, the second ear-wearable device comprising:

a. a second control circuit;

b. a second electroacoustic transducer, wherein the second transducer is configured to generate sound and is in electrical communication with the second control circuit;

c. the second microphone, wherein the second microphone is in electrical communication with the second control circuit;

d. a second memory storage; and e. a second wireless communication device; and wherein the second ear-wearable device is configured to:

be worn by the user in contact with a second ear of the user;

direct sound from the first transducer toward the user's ear when the second ear-wearable device is worn by the user; and wirelessly transmit the second input audio signal received at the second microphone.

4. The hearing assisting system of claim 1, further comprising a gateway device, the gateway device comprising:

a. a gateway device control circuit;

b. a gateway device memory; and c. a gateway device wireless communication device, wherein the gateway device memory stores instructions for:

wirelessly receiving, at the gateway device wireless communication device, the first input audio signal and the second input audio signal;

processing the first input audio signal and the second input audio signal to identify the first audio content information and the first audio direction information; and wirelessly transmitting, to the vision device, the first display information to cause the vision device to display the non-transcript content representation of the first audio content information and the direction representation of the first audio direction information using the display device.

5. The hearing assisting system of claim 4, wherein the vision device further comprises a first vision device microphone positioned on the vision device and a second vision device microphone, wherein the system analyzes audio input from the first microphone, the second microphone, the first vision device microphone, and the second vision device microphone to process the first input audio signal and the second input audio signal to identify the first audio content information and the first audio direction information, and wherein first vision device microphone is spaced apart from the second vision device microphone by at least 2 centimeters.

6. The hearing assisting system of claim 4, wherein the gateway device memory stores instructions for:

a. identifying a presence of a first emergency notification sound as the first audio content information within the first audio content information; and b. upon identifying the presence of the first emergency notification sound, the non-transcript content representation will identify the first emergency notification sound;

wherein the first emergency notification sound is one of the group consisting of a siren, an emergency vehicle siren, a tornado siren, an emergency weather siren, a public safety siren, a horn, a train whistle, a train horn, a vehicle horn, a smoke alarm, a fire alarm, a carbon-monoxide alarm, and a law enforcement announcement.

7. The hearing assisting system of claim 6, configured to, upon displaying content representation, apply a tinting to the lens portion for an alert time period.

8. The hearing assisting system of claim 4, wherein the gateway device memory stores instructions for identifying a name call as the first audio content information within the first audio content information, wherein the instructions comprise a user name and user name variations.

9. The hearing assisting system of claim 4, wherein the first ear-wearable device further comprises a telecoil, wherein the hearing assisting system is configured to:

a. detect a first electromagnetic signal at the telecoil, b. analyze the first electromagnetic signal to determine telecoil information related to a presence of an appliance that generated the first electromagnetic signal in an environment of the first ear-wearable device, and c. transmit, to the vision device, telecoil display information to cause the vision device to display a representation of telecoil information using the display device.

10. The hearing assisting system of claim 1, wherein the direction representation comprises text describing a direction of a sound within the first audio information.

11. The hearing assisting system of claim 1, wherein the direction representation comprises an arrow pointing toward a direction of a sound within the first audio information.

12. The hearing assisting system of claim 1, wherein the direction representation comprises tinting of a lens portion in a direction opposite from a direction of a sound within the first audio information.

13. The hearing assisting system of claim 1 wherein the vision device comprises a contact lens configured to be worn on an eyeball of a user.

14. The hearing assistance system of claim 13, wherein the contact lens comprises:

a. an electronic component layer including a display device that is configured to provide visual information to the user; and b. outer encasing layers.

15. The hearing assistance system of claim 14, wherein the contact lens further comprise a contact lens microphone.

16. A method comprising:

receiving a first audio signal at a first microphone of an ear-wearable device of a hearing assisting system;

receiving a second audio signal at a second microphone of the hearing assisting system, wherein the first audio signal and second audio signal comprise first audio information from a first time period;

processing, by a processing system that includes one or more processors, the first input audio signal and the second input audio signal to identify first audio content information and first audio direction information related to the first audio content information; and wirelessly transmitting, to a wearable vision device, first display information to cause the vision device to display a non-transcript content representation of the first audio content information and a direction representation of the first audio direction information using a display device of the vision device, wherein the vision device further comprises or defines a lens portion, wherein the vision device is configured to be worn by a user so that the user looks through the lens portion, wherein the display device is configured to display visual information to the user when the user is wearing the vision device;

wherein the ear-wearable device comprises a first transducer configured to be positioned within an ear of a user and a hearing device housing, the hearing device housing comprising:

a flexible mother circuit comprising and electrically connected to:

a digital signal processor;

an audio output device electrically connected to the digital signal processor, a plurality of user switches electrically connected to the digital signal processor, wherein the user switches control volume and on/off;

an inertial measurement unit (IMU) sensor; and a first memory storage device configured to store data from the IMU sensor;

wherein the first display information comprises at least one menu prompt to control the ear-wearable device, and wherein the hearing assisting system is configured to receive user input to execute the at least one menu prompt displayed, and wherein the at least one menu prompt is executed by the user tapping on the ear-wearable device.

17. The method of claim 16, further comprising:

a. identifying, by a processing system that includes one or more processors, a presence of a first emergency notification sound as the first audio content information within the first audio content information; and b. upon identifying the presence of the first emergency notification sound, the non-transcript content representation will identify the first emergency notification sound;

wherein the first emergency notification sound is one of the group consisting of a siren, an emergency vehicle siren, a tornado siren, an emergency weather siren, a public safety siren, a horn, a train whistle, a train horn, a vehicle horn, a smoke alarm, a fire alarm, a carbon-monoxide alarm, and a law enforcement announcement.

18. The method of claim 16, further comprising identifying, by the processing system, a name call as the first audio content information within the first audio content information, wherein a memory system comprising one or more memory devices stores instructions comprising a user name and user name variations.

19. The method of claim 16, wherein the first ear-wearable device further comprises a telecoil, further comprising:

a. detecting a first electromagnetic signal at the telecoil, b. analyzing, using the processing system, the first electromagnetic signal to determine telecoil information related to a presence of an appliance that generated the first electromagnetic signal in an environment of the ear-wearable device, and c. transmitting, to the vision device, telecoil display information to cause the vision device to display a representation of telecoil information using the display device.

20. A method comprising:

obtaining, by a processing system that includes one or more processors implemented in circuitry, a signal from a telecoil of an ear-wearable device, wherein the ear-wearable device is configured to be worn by a user in contact with an ear of the user and direct sound from a first electroacoustic transducer toward the user's ear when the first ear-wearable device is worn by the user;

determining, by the processing system, telecoil information related to a presence of an electromagnetic signal in an environment of the ear-wearable device, based at least in part on the signal from the telecoil;

wirelessly transmitting, to a wearable vision device, first display information to cause the vision device to display a representation of the telecoil information using a display device of the vision device, wherein the vision device further comprises or defines a lens portion, wherein the vision device is configured to be worn by the user so that the user looks through the lens portion, wherein the display device is configured to display visual information to the user when the user is wearing the vision device;

wirelessly receiving, by the telecoil, audio information from a magnetic field produced by a listening system; and generating sound, by the first electroacoustic transducer, containing the audio information from the magnetic field;

wherein the ear-wearable device comprises the first electroacoustic transducer configured to be positioned within an ear of a user and a hearing device housing, the hearing device housing comprising:

a flexible mother circuit comprising and electrically connected to:

a digital signal processor;

an audio output device electrically connected to the digital signal processor, a plurality of user switches electrically connected to the digital signal processor, wherein the user switches control volume and on/off;

an inertial measurement unit (IMU) sensor; and a first memory storage device configured to store data from the IMU sensor;

wherein the first display information comprises at least one menu prompt to control the ear-wearable device, and wherein the hearing assisting system is configured to receive user input to execute the at least one menu prompt displayed, and wherein the at least one menu prompt is executed by the user tapping on the ear-wearable device.

\* \* \* \* \*